(12) United States Patent
Tanaka et al.

(10) Patent No.: US 6,292,881 B1
(45) Date of Patent: Sep. 18, 2001

(54) MICROPROCESSOR, OPERATION PROCESS EXECUTION METHOD AND RECORDING MEDIUM

(75) Inventors: Ritsuko Tanaka, Kawasaki; Yuji Nomura, Fukuoka; Toru Tsuruta, Kawasaki; Nobuyuki Iwasaki, Fukuoka, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/257,198

(22) Filed: Feb. 25, 1999

(30) Foreign Application Priority Data

Mar. 12, 1998 (JP) .................................... 10-061595

(51) Int. Cl.[7] .................. G06F 9/40; G06F 9/34; G06F 9/38
(52) U.S. Cl. ..................... 712/41; 712/210; 712/211; 712/245
(58) Field of Search .................. 712/24, 1, 23, 712/41, 42, 43, 15, 13, 18, 215, 227, 245, 218, 210, 214, 212; 709/249, 246; 370/402

(56) References Cited

U.S. PATENT DOCUMENTS

| 5,361,373 | * | 11/1994 | Gilson | 712/1 |
|---|---|---|---|---|
| 5,490,252 | * | 2/1996 | Macera et al. | 709/249 |
| 5,630,157 | * | 5/1997 | Dwyer, III | 712/23 |
| 5,794,063 | * | 8/1998 | Favor | 712/23 |

FOREIGN PATENT DOCUMENTS

| 58-94035 | 6/1983 | (JP) . |
|---|---|---|
| 5-181669 | 7/1993 | (JP) . |
| 5-181673 | 7/1993 | (JP) . |
| 9-44355 | 2/1997 | (JP) . |

\* cited by examiner

*Primary Examiner*—Daniel H. Pan
(74) *Attorney, Agent, or Firm*—Staas & Halsey LLP

(57) ABSTRACT

A microprocessor capable of executing a process instruction having at least one RISC type instruction is constructed to include an instruction decoding section for decoding a microcode including information which indicates transfer contents of input and output data and address information which indicates a storage location of the process instruction, a data reading section for reading input data corresponding to the information which indicates the transfer contents of the input and output data decoded by the instruction decoding section and reading the process instruction corresponding to the address information, and an operation process executing section for implementing one or a plurality of operation unit resources capable of executing an operation process according to the input data read by the data reading section and the process instruction.

30 Claims, 27 Drawing Sheets

* PROCESS INSTRUCTION:COMBINATION OF RISC TYPE INSTRUCTIONS

- RISC TYPE : (a+b)*b  OPERATION PROCESS INSTRUCTION

USED OPERATION UNIT  INSTRUCTION① : ALU(a+b) → INSTRUCTION② : MPY(*b)

ONLY 1 OPERATION UNIT USABLE BY 1 INSTRUCTION

- MAC STRUCTURE TYPE (DSP, ETC.) <u>(a+b)*b</u> OPERATION PROCESS INSTRUCTION

USED OPERATION UNIT <u>INSTRUCTION① : ALU(a+b) → INSTRUCTION② : MPY(*b)</u>

MPY→ALU FIXED CONNECTION

FIG. 23
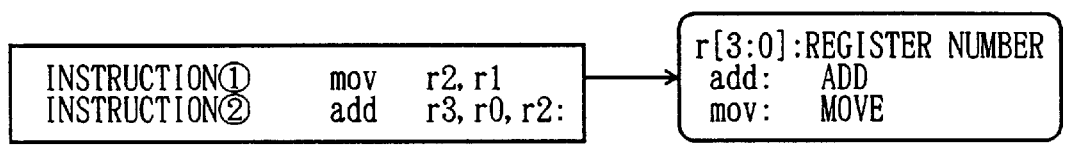
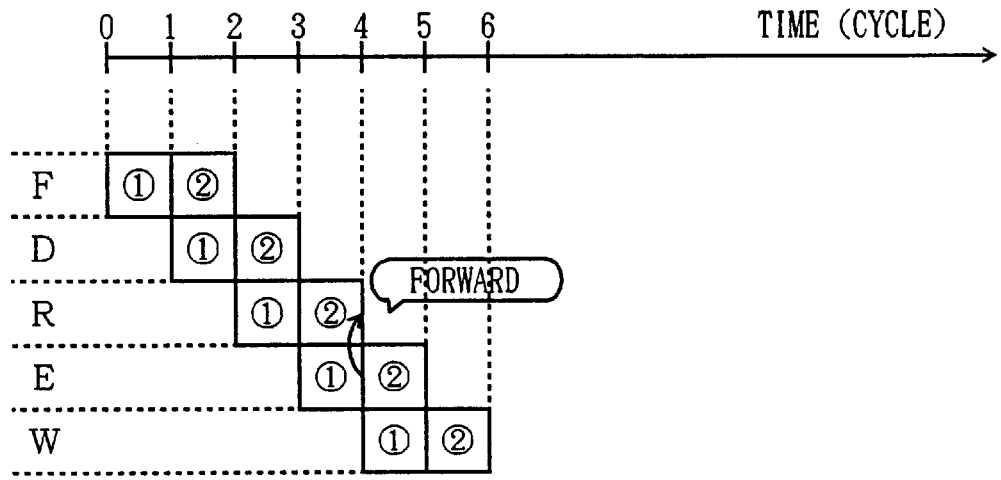

MICROPROCESSOR, OPERATION PROCESS EXECUTION METHOD AND RECORDING MEDIUM

BACKGROUND OF THE INVENTION

1. Field of the Invention

The present invention generally relates to microprocessors, operation process execution methods and recording mediums, and more particularly to a microprocessor, an operation process executing means and a computer-readable recording medium capable of executing an operation process corresponding to a microcode.

Recently, the operation speed and the integration density of microprocessors have improved considerably. Such improvements have lead to improvements in the hardware technology of personal computers, portable terminal equipments and the like, and to improvements in the information processing technology of personal computers and the like.

However, due to the recent developments in the information processing technology, the operation processing system itself has become high-speed and complex. As a result, the band width of a storage part such as a cache has increased, thereby requiring the hardware and the software to be re-designed every time the band width is increased.

Accordingly, there are demands to realize a microprocessor which can be developed within a short time, without increasing the band width of the storage part such as the cache, even if the operation processing system itself becomes high-speed and complex.

2. Description of the Related Art

A description will be given of a typical conventional microprocessor which executes a predetermined operation process according to a microcode which is an instruction code.

FIG. 1 shows a hardware construction of a conventional Very Long Instruction Word (VLIW) type microprocessor.

Because of the need to execute a large amount of operation processes at a high speed, the microprocessor shown in FIG. 1 is formed by a plurality of pipelines for carrying out a pipeline process and executing an operation process in parallel. Each pipeline is constructed from an operation instruction reading part 311, an operation instruction decoding part 312, a data reading part 313, an operation process executing part 314, and an operation result writing part 315. Because this conventional microprocessor is formed by the plurality of pipelines, a horizontal development is made with respect to an operation process instruction which executes complex operation process instructions by the plurality of pipelines.

For example, in a case where the microprocessor is formed by four kinds of pipelines 301, 302, 303 and 304 as shown in FIG. 1, an operation result of each pipeline is written in a storage part 305, and the operation result is read by another pipeline via the storage part 305, so that data transfer is possible among the pipelines. In addition, if there is a conflict in the writing of the operation results from the pipelines to the storage part 305, an arbitration process is carried out by a write arbitration part 306 to avoid the conflict.

Next, a description will be given of the functions of each of the parts forming the pipeline of the microprocessor having the above described construction.

The operation instruction reading part 311 has a function of reading (fetching) a microcode including information which indicates transfer contents of input and output data required for the operation process, and a process instruction. The process instruction refers to an instruction which is subjected to an operation processing one pipeline.

The operation instruction decoding part 312 has a function of decoding the microcode read by the operation instruction reading part 311.

The data reading part 313 has a function of reading from the storage part 305 the input data necessary for the operation process, based on the information which indicates the transfer contents of the input and output data and is included in the microcode decoded by the operation instruction decoding part 312.

The operation process executing part 314 has a function of carrying out a predetermined operation according to the process instruction decoded by the operation instruction decoding part 312 and the input data read by the data reading part 313. In the conventional microprocessor, the operation process executing part 314 includes a single operation unit resource. In addition, a basic instruction which uses one operation unit resource is called a Reduced Instruction Set Computer (RISC) type instruction.

The operation result writing part 315 has a function of writing the operation result of the operation process executing part 314 in the storage part 305.

On the other hand, FIG. 2 is a time chart showing an operation process of a Complex Instruction Set Computer (CISC) type microprocessor.

The CISC type microprocessor is capable of processing process instructions of high-level function operation processes which are complex, such as multiplication and division, and string operation. In other words, the CISC type microprocessor can reduce the total number of instructions to be executed, by making one process instruction carry out a plurality of RISC type instructions.

A description will be given of the process of the CISC type microprocessor for an example shown in FIG. 2, where process instructions of an instruction "a" and an instruction "b" are to be executed. In FIG. 2, Fa and Fb respectively indicate times of fetch cycles of the process instructions "a" and "b", D(1) through D(4) respectively indicate decoding times of RISC type instructions within the process instruction "a", D(5) through D(8) respectively indicate decoding times of RISC type instructions within the process instruction "b", R(1) through R(4) respectively indicate read times of input data necessary to execute the process instruction "a", R(5) through R(8) respectively indicate read times of input data necessary to execute the process instruction "b", E(1) through E(4) respectively indicate execution times of the RISC type instructions within the process instruction "a", E(5) through E(8) respectively indicate execution times of the RISC type instructions within the process instruction "b", W(1) through W(4) respectively indicate write times of operation results of the RISC type instructions within the process instruction "a", and W(5) through W(8) respectively indicate write times of operation results of the RISC type instructions within the process instruction "b". In addition, it is assumed for the sake of convenience that each of the process instructions "a" and "b" is made up of four RISC type instructions, for example.

The CISC type microprocessor fetches the process instruction "a" in 4 cycles (Fa), and carries out a decoding process (D(1) through D(4)), a read process (R(1) through R(4)), an instruction execution process (E(1) through E(4)), and a write process (W(1) through W(4)) in the sequence shown, for every RISC type instruction within the process instruction "a". Hence, the processing of the process instruction "a" ends in 11 cycles as shown in FIG. 2.

In addition, simultaneously as the decoding process (D(1) through D(4)) after fetching the process instruction "a", the CISC type microprocessor fetches the next process instruction "b" (Fb), and carries out a decoding process (D(5) through D(8)), a read process (R(5) through R(8)), an instruction execution process (E(5) through E(8)), and a write process (W(5) through W(8)) in the sequence shown, for every RISC type instruction within the process instruction "b". Therefore, the processing of the process instruction "a" and he process instruction "b" ends in a total of 15 cycles, as shown in FIG. 2.

According to the CISC type microprocessor, a cycle per instruction (CPI) becomes long by making one process instruction carry out a plurality of RISC type instructions, but the number of instructions executed within the entire program can be reduced.

On the other hand, FIG. 3 is a time chart showing an operation process of a RISC type microprocessor.

The RISC type microprocessor is designed to compensate for the low-level function of the hardware using software technology. When executing a program written in a high-level language, the RISC type microprocessor can carry out a high-speed process by reducing the number of execution cycles of basic instructions which occur frequently. In other words, the content of one process instruction is formed solely by the RISC type instructions or, is divided into the RISC type instructions in advance, so that the CPI can be reduced.

A description will be given of the process of the RISC type microprocessor for an example shown in FIG. 3, where RISC type instructions (1) through (8) are to be executed. In FIG. 3, F(1) through F(8) respectively indicate fetch cycle times of the RISC type instructions (1) through (8), D(1) through D(8) respectively indicate the decoding times of the RISC type instructions (1) through (8), R(1) through R(8) respectively indicate the read times required to execute the RISC type instructions (1) through (8), E(1) through E(8) respectively indicate the execution times of the RISC type instructions (1) through (8), and W(1) through W(8) respectively indicate the write times of operation results of the RISC type instructions (1) through (8).

The RISC type processor fetches the RISC type instruction (1) (F(1)), and carries out a decoding process (D(1)), a read process (R(1)), an instruction execution process (E(1)), and a write process (W(1)) with respect to the RISC type instruction (1) in the sequence shown. Hence, the processing of the RISC type instruction (1) ends in 5 cycles as shown in FIG. 3.

In addition, simultaneously as the decoding process (D(1)) after fetching the RISC type instruction (1), the RISC type microprocessor fetches the next RISC type instruction (2), and carries out a decoding process (D(2)), a read process (R(2)), an instruction execution process (E(2)), and a write process (W(2)) with respect to the RISC type instruction (2) in the sequence shown. Thereafter, similar processes (F(3) through F(8), D(3) through D(8), R(3) through R(8), E(3) through E(8), and W(3) through W(8)) are carried out with respect to the RISC type instructions (3) through (8). Therefore, the processing of the RISC type instructions (1) through (8) ends in a total of 12 cycles as shown in FIG. 3.

Accordingly, the CPI can be reduced in the process of the RISC type microprocessor, by forming the contents of one process instruction solely from the RISC type instructions.

However, the conventional microprocessor has problems in that the microcode becomes extended due to the high level and complexity of the instruction system, and the band width of the storage part such as the cache increases due to the operation processing pipelines which are arranged in parallel.

In addition, although the conventional CISC type microprocessor can reduce the number of process instructions as shown in FIG. 2 by forming a plurality of RISC type instructions into one high-level process instruction, there is a problem in that the CPI increases. On the other hand, although the conventional RISC type microprocessor can reduce the CPI as shown in FIG. 3 by simplifying the process instruction so that one process instruction is divided in advance into a plurality of RISC type instructions, there is a problem in that the number of process instructions increases. Therefore, the problem encountered in the conventional CISC type microprocessor and the problem encountered in the conventional RISC type microprocessor are contrary to each other.

In addition, in the conventional microprocessor, an operation result of one operation unit resource is stored in a storage part such as a register, and the data is exchanged with the next operation unit resource by making a reference to the storage part. For this reason, in order to secure a write time to the storage part between a time when the operation result becomes definite and a time when the data is referred, the conventional microprocessor requires a minimum interval of one cycle or greater, and cannot execute the operation process in a minimum number of cycles.

Moreover, when one process instruction includes a plurality of RISC type instructions and the operation result of one RISC type instruction is not used as an input of another RISC type instruction, the conventional microprocessor writes the operation results of the RISC type instructions in the storage part in the input sequence of the RISC type instructions. Consequently, the subsequent RISC type instruction is held until the operation process of the preceding RISC type instruction ends, and a pipeline stall is generated during this time, thereby making it impossible to execute the operation process in a minimum number of cycles.

Furthermore, in a case where a conflict occurs among the writing from the pipelines to the storage part, the conventional microprocessor carries out an arbitration process in the write arbitration part to avoid the conflict. However, when the pipelines are arranged in parallel, there is a problem in that the control of the arbitration process becomes complex.

On the other hand, the conventional microprocessor reads the input data from the storage part and executes a predetermined operation process, but the input data is not held. For this reason, the same input data must be read again if necessary, thereby preventing the operation process from being executed efficiently. In addition, the conventional microprocessor has a problem in that the input data which is read again changes depending on other operation processes which are executed.

The conventional microprocessor also has problems in that the scale of the hardware increases and the power consumption increases as the number of pipelines arranged in parallel increases.

SUMMARY OF THE INVENTION

Accordingly, it is an object of the present invention to provide a novel and useful microprocessor, operation process execution method and recording medium, in which the problems described above are eliminated.

Another and more specific object of the present invention is to provide a microprocessor, operation process executing method and computer-readable recording medium, which can cope with the complex and high-level operation process instruction (process instruction) without extending the microcode, enable an operation process to be executed efficiently depending on the operation process instruction, and reduce both the hardware scale and power consumption.

Still another object of the present invention is to provide a microprocessor capable of executing a process instruction having at least one Reduced Instruction Set Computer (RISC) type instruction, is characterized by: instruction decoding means (corresponding to an operation instruction decoding part 3 of an embodiment described later) for decoding a microcode including information which indicates transfer contents of input and output data and address information which indicates a storage location of the process instruction; data reading means (corresponding to a data reading part 4 of the embodiment described later) for reading input data corresponding to the information which indicates the transfer contents of the input and output data decoded by said instruction decoding means, and reading the process instruction corresponding to the address information; and operation process executing means (corresponding to an operation process executing part 7 of the embodiment described later) for implementing one or a plurality of operation unit resources (corresponding to operation unit resources 36, 37, 38, 42, 43, 44, 45, 63, 64, 65, 77, 78, 79, 80 of the embodiment described later) capable of executing an operation process according to the input data read by said data reading means and the process instruction.

By constructing the microprocessor according to the present invention in this manner, it is possible to read a process instruction based on the address information which indicates the storage location of the process instruction forming the microcode, thereby making it possible to cope with a complex and high-level operation process instruction without extending the microcode.

In addition, the microcode which is used to execute an operation process in the microprocessor according to the present invention includes the address information which indicates the storage location of the process instruction. For this reason, it is possible to minimize the microcode and use a fixed length, even in a case where the operation process is complex. Hence, the microprocessor according to the present invention can reduce the capacity of a storage part such as an instruction cache, by reducing the size of the microcode.

The microprocessor above may be characterized in that: the microcode is capable of implementing at least one RISC type instruction, directly, in place of the address information which indicates the storage location of the process instruction.

For example, in a case where the process instruction is a basic instruction (RISC type instruction), the instruction is not as complex as compared to decoding the process instruction from the address information which indicates the storage location of the process instruction, and the word width and the bit width of the microcode will not increase. For this reason, it is possible to directly implement the RISC type instruction as the process instruction.

Therefore, the RISC type instruction executed by the microprocessor according to the present invention does not need to read the process instruction from the address information, and the operation process can be executed efficiently.

The microprocessor above may further be characterized by: process instruction storage means (corresponding to a look up table (LUT) 6 of the embodiment described later) capable of arbitrarily constructing a process instruction; and input and output data storage means (corresponding to a storage part 5 of the embodiment described later) for storing an operation result of said operation process executing means and input data which can be set arbitrarily, where said data reading means reads a corresponding process instruction by referring to said process instruction storage means based on the address information which indicates the storage location of the process instruction, and further reading from said input and output data storage means the input data corresponding to the information which indicates the transfer contents of the input and output data.

According to the microprocessor of the present invention, a predetermined process instruction from the process instruction storage means corresponding to the address information, and the operation process is executed according to the process instruction. In addition, by forming the process instruction storage means by a rewritable RAM, it becomes possible for the user to arbitrarily specify a complex process instruction, thereby making it possible to easily cope with the complexity and high level of the operation process which will further increase in the future.

Furthermore, since the user can arbitrarily specify a complex process instruction due to the provision of the process instruction storage means, the microprocessor according to the present invention can easily cope with a change in version by modifying the process instruction storage means, without the need to modify a complex control program. At the same time, it is easier to guarantee compatibility of the application program.

The microprocessor above may be characterized in that: said operation process executing means includes a plurality of operation unit resources (corresponding to operation unit resources 36, 37, 38, 42, 43, 44, 45, 63, 64, 65, 77, 78, 79 and 80 of the embodiment described later) which can be connected arbitrarily, by modifying the process instruction within said process instruction storage means, where an operation result of one of the operation unit resources is directly used as an input to a next operation unit resource.

The microprocessor above may be characterized in that: said operation process executing means includes a through-path (corresponding to a through-path shown in FIG. 14 of the embodiment described later) which propagates the input data with respect to a process which requires no further operation unit resource, where an output result of the through-path is directly used as an input to a next operation unit resource.

According to the microprocessor of the present invention, the sequence in which the operation unit resources within the operation process executing means are used and the number of operation unit resources used can be changed arbitrarily by the user. Furthermore, it is possible to efficiently carry out the operation process by propagating the input and output data via the through-path when not using the operation unit resource.

The microprocessor above may be characterized in that: said operation process executing means outputs only an operation result of a final operation unit resource corresponding to the process instruction when an operation result of one operation unit resource is directly used as an input to a next operation unit resource.

According to the microprocessor of the present invention, it is possible to use the operation result of one operation unit resource directly as the input to the next operation unit resource. As a result, the exchange of the operation result with the input and output data storage means is reduced, thereby preventing conflict of accesses to the input and output data storage means.

The microprocessor above may be characterized in that: said operation process executing means executes in parallel RISC type instructions implemented in the process instruction, and outputs operation results in a sequence in which operation processes end, independently of an executing sequence of the operation processes.

According to the microprocessor of the present invention, the operation process is carried out in parallel in the input sequence of the operation process instruction to the operation process executing means (the execution of the operation process in the input sequence of the operation process instruction will hereinafter be referred to as an in-order execution), and further, the operation result is written in the input and output data storage means in an end sequence of the operation process (the writing of the operation result in the end sequence of the operation process will hereinafter be referred to as an out-of-order output).

Although the conventional microprocessor makes the in-order execution similarly to the present invention, the operation result is written into the input and output data storage means in the input sequence of the operation process instruction, independently of the end of the operation process (the writing of the operation result in the input sequence of the operation process instruction will hereinafter be referred to as an in-order output).

Accordingly, because the microprocessor of the present invention writes the operation result in the input and output data storage means in the end sequence of the operation process, without making a previously ended operation process wait, it is possible for an operation process instruction to go ahead of another, thereby making it possible to execute the operation process in a minimum number of cycles.

The microprocessor above may be characterized in that: each operation unit resource within said operation process executing means has a multi-port construction (corresponding to write parts 46, 47, 48 and 49 of the embodiment described later) for independently outputting operation results.

According to the microprocessor of the present invention, it is possible to avoid conflict of the writing of the operation results of the operation unit resources.

The microprocessor above may be characterized in that: said operation process executing means carries out a conflict resolution process using another operation unit resource having the same function if a plurality of operation unit resource having the same function exist, a plurality of RISC type instructions are included within one process instruction, and a conflict of the operation unit resources occurs when the RISC type instructions are executed in parallel.

According to the microprocessor of the present invention, it is possible to execute a conflict resolution process with respect to the operation process instruction, by distributing the plurality of operation unit resources which have the same function an are arranged in the same pipeline.

The microprocessor above may further be characterized by: a first path (corresponding to a storage part 51 of the embodiment described later) notifying directly to said data reading means an operation result of a final operation unit resource corresponding to a process instruction executed by said operation process executing means, simultaneously as storing said operation result in said input and output data storage means; and a second path (corresponding to the storage part 51 of the embodiment described later) notifying to said data reading means said operation result after latching said operation result, where said data reading means reads the operation result from one of said first and second paths instead of from said input and output data storage means, when using said operation result in a next process instruction.

According to the microprocessor of the present invention, the first path notifies the operation result directly to the data reading means, and the second path notifies the operation result to the data reading means after latching the operation result. For this reason, it is unnecessary to exchange the operation result via the input and output data storage means, and the operation process can be executed in a minimum number of cycles.

The microprocessor above may further be characterized by: a third path (corresponding to latches 61, 71, 72, 73 and 74 of the embodiment described later) notifying an operation unit resource within said operation process executing means after latching the input data read by said data reading means, where said operation process executing means reads the input data from said third path when reusing said input data.

The microprocessor of the present invention latches the input data from the input and output data storage means such as a register, cache and memory. Thus, it is unnecessary to input the input data again, and the input data can be reused during operation by the operation unit resource. Accordingly, the microprocessor of the present invention can use the input data before it is rewritten, even in a case where the input data is rewritten by another operation process.

The microprocessor above may further be characterized by: a fourth path (corresponding to a through-path shown in FIGS. 24, 25A and 25B in the embodiment described later) notifying directly to an operation unit resource within said operation process executing means the input data read by said data reading means, where said operation process executing means uses the input data from one of said third and fourth paths.

According to the microprocessor of the present invention, it is possible to minimize an operation process delay necessary to latch the input and output data from the input and output data storage means.

The microprocessor above may be characterized in that: the latched input data is usable in each operation unit resource within said operation process executing means.

The microprocessor above may be characterized in that: said data reading means has an input port with a multi-port structure for inputting the input data from said input and output data storage means, and simultaneously supplies the input data to each operation unit resource.

According to the microprocessor of the present invention, the input port for the input data has the multi-port structure, and the necessary input data can be input simultaneously. For this reason, it is unnecessary to repeatedly read the input data from the input and output data storage means, and the time required to execute the operation process is minimized.

The microprocessor above may further be characterized by: a plurality of pipelines (corresponding to pipelines 11, 11a and 11n of the embodiment described later) capable of executing an operation process corresponding to the microcode.

According to the microprocessor of the present invention, it is possible to efficiently execute the operation process by providing the plurality of pipelines capable of executing the operation process corresponding to the microcode.

A further object of the present invention is to provide a microprocessor capable of executing a process instruction having at least one Reduced Instruction Set Computer (RISC) type instruction, is characterized by: a plurality of operation unit resources (corresponding to operation unit resources 36, 37, 38, 42, 43, 44, 45, 63, 64, 65, 77, 78, 79 and 80 of the embodiment described later) capable of executing an operation process according to an input data and a process instruction, and arbitrarily connectable by modifying the process instruction, where an operation result of one operation unit resource is used as an input to a next operation unit resource, without being temporarily stored.

The microprocessor may further be characterized by: a through-path (corresponding to a through-path shown in FIG. 14 in the embodiment described later) which propagates the input data with respect to a process which requires no further operation unit resource, wherein output result of the through-path is directly used as an input to a next operation unit resource.

According to the microprocessor of the present invention, the sequence in which the operation unit resources within the operation process executing means are used and the number of operation unit resources used can be changed arbitrarily by the user. In addition, it is possible to efficiently execute the operation process by propagating the input and output data via the through-path when not using the operation unit resource.

The microprocessor may be characterized in that: only an operation result of a final operation unit resource corresponding to the process instruction is output when the operation result of the one operation unit resource is directly used as the input to the next operation unit resource without being temporarily stored.

According to the microprocessor of the present invention, it is possible to directly use the operation result of one operation unit resource as the input to the next operation unit resource. Consequently, the exchange of the operation result with the input and output data storage means is reduced, thereby preventing a conflict of accesses to the input and output data storage means.

Another object of the present invention is to provide a microprocessor capable of executing a process instruction having at least one Reduced Instruction Set Computer (RISC) type instruction, and is characterized by: operation process executing means for executing in parallel RISC type instructions implemented in the process instruction, and outputting operation results in a sequence in which operation processes end, independently of an executing sequence of the operation processes.

According to the microprocessor of the present invention, the operation process is carried out in parallel in the input sequence of the operation process instruction to the operation process executing means (the execution of the operation process in the input sequence of the operation process instruction will hereinafter be referred to as an in-order execution), and further, the operation result is written in the input and output data storage means in an end sequence of the operation process (the writing of the operation result in the end sequence of the operation process will hereinafter be referred to as an out-of-order output).

Although the conventional microprocessor makes the in-order execution similarly to the present invention, the operation result is written into the input and output data storage means in the input sequence of the operation process instruction, independently of the end of the operation process (the writing of the operation result in the input sequence of the operation process instruction will hereinafter be referred to as an in-order output).

Accordingly, because the microprocessor of the present invention writes the operation result in the input and output data storage means in the end sequence of the operation process, without making a previously ended operation process wait, it is possible for an operation process instruction to go ahead of another, thereby making it possible to execute the operation process in a minimum number of cycles.

Still another object of the present invention is to provide a microprocessor capable of executing a process instruction having at least one Reduced Instruction Set Computer (RISC) type instruction, and is characterized by: a plurality of operation unit resources executing an operation process according to an input data and a process instruction, where each of said operation unit resource has a multi-port structure independently outputting an operation result.

According to the microprocessor of he present invention, it is possible to avoid conflict of the writing of the operation results of the operation unit resources.

A further object of the present invention is to provide an operation process execution method for a microprocessor capable of executing a process instruction having at least one Reduced Instruction Set Computer (RISC) type instruction, is characterized by: an instruction decoding step decoding a microcode including information which indicates transfer contents of input and output data and address information which indicates a storage location of the process instruction; a data reading step reading input data corresponding to the information which indicates the transfer contents of the input and output data decoded by said instruction decoding step, and reading the process instruction corresponding to the address information; and an operation process executing step implementing one or a plurality of operation unit resources capable of executing an operation process according to the input data read by said data reading means and the process instruction.

According to the operation process execution method of the present invention, the microprocessor can read the process instruction corresponding to the address information which indicates the storage location of the process instruction forming the microcode. As a result, it is possible to cope with a complex and high-level operation process instruction, without extending the microcode.

Another object of the present invention is to provide a microprocessor characterized by: instruction decoding means for decoding a microcode; and operation process executing means including a plurality of operation unit resources capable of executing an operation process in parallel and more than said instruction decoding means, where an operation sequence of the operation unit resources being variable in said operation process executing means.

The microprocessor may be characterized in that said plurality of operation unit resources are made up of different operation units.

According to the microprocessor of the present invention, it is possible to realize various operation instructions by making it possible to change the operation sequence of the operation unit resources. In addition, by using the operation unit resource which can execute such a function in parallel, it is possible to realize a pipeline process and a parallel operation process, thereby realizing a high-speed operation link a DSP and a high-speed operation like a multiprocessor. Moreover, by making the operation unit resources different, it becomes possible to realize parallel or pipeline process using a minimum number of operation units on the order of the number of operation units used in the RISC type microprocessor.

Still another object of the present invention is to provide a microprocessor characterized by: instruction decoding means for decoding a microcode made up of a basic instruction code and an operation identification (ID) indicating a storage location of an extended instruction code; and operation process executing means for executing an operation process by selecting operation unit resources based on an operation instruction decoded by said instruction decoding means, where a pipeline process is carried out by selecting a first operation unit resource by the basic instruction code and selecting a next operation unit resource by the extended instruction code.

According to the microprocessor of the present invention, it is possible to provide a sufficient time margin for decoding the microcode which carries out a complex operation (like that of a CISC type). Hence, both the first operation of the microcode which carries out the complex operation and the simple operation like the RISC type instruction can be executed immediately, similarly to the case of the RISC type microprocessor.

A further object of the present invention is to provide a microprocessor capable of decoding a microcode which uses a plurality of operation unit resources, and is characterized by: a function of automatically allocating inputs and outputs among the operation unit resources depending on a free internal resource, where said function requires no inputs and outputs among the operation unit resources to be specified within the microcode.

The microprocessor may be characterized in that: an output one operation unit resource is directly connected to an input of another operation unit resource which is used for a next operation, thereby eliminating a need to use an input and output means for inputting and outputting operation results among the operation unit resources.

In other words, by not temporarily writing to the input and output data storage means, it becomes unnecessary to include a unique number of the input and output data storage means in the microcode, and the microcode can consequently be shortened.

The unique number refers to the address information which indicates the storage location of the input data and the output data. As shown in FIG. 6 which shows a microcode structure, even with respect to the same operation, the VLIW requires the microcode to include the address information which indicates the storage location of the input and output data for each operation within the process instruction. On the other hand, in the present invention, no temporary writing is made to the input and output data storage means during the operation within the process instruction, and for this reason, the present invention does not require the microcode to include the address information which indicates the storage location of the input and output data during the operation. In other words, according to the present invention, it is possible to include in the microcode only the address information which indicates the input and output data in units of the process instruction.

Another object of the present invention is to provide a microprocessor architecture for a microprocessor capable of executing a process instruction having at least one Reduced Instruction Set Computer (RISC) type instruction, is characterized by: instruction decoding means for decoding a microcode including information which indicates transfer contents of input and output data, and address information which indicates a storage location of the process instruction;

data reading means for reading an input data corresponding to the information which indicates the transfer contents of the input and output data decoded by said instruction decoding means, and a process instruction corresponding to the address information; and operation process executing means for implementing one or a plurality of operation unit resources capable of executing an operation process according to the input data read by said data reading means and the process instruction.

According to the microprocessor architecture of the present invention, it is possible to read the process instruction based on the address information which indicates the storage location of the process instruction forming the microcode. Hence, it is possible to cope with a complex and high-level operation process instruction, without extending the microcode.

Still another object of the present invention is to provide a computer-readable recording medium recited in claim 28 storing circuit information which is written in a hardware description language and is related to a microprocessor capable of executing a process instruction having at least one Reduced Instruction Set Computer (RISC) type instruction, is characterized by: a first data region storing circuit information related to instruction decoding means for decoding a microcode including information which indicates transfer contents of input and output data, and address information which indicates a storage location of the process instruction; a second data region storing circuit information related to data reading means for reading an input data corresponding to the information which indicates the transfer contents of the input and output data decoded by said instruction decoding means, and a process instruction corresponding to the address information; and a third data region storing circuit information related to operation process executing means for implementing one or a plurality of operation unit resources capable of executing an operation process according to the input data read by said data reading means and the process instruction.

According to the recording medium of the present invention, the computer system can read the process instruction based on the address information which indicates the storage location of the process instruction forming the microcode based on the circuit information. Hence, it is possible to design a microprocessor which can cope with a complex and high-level operation process instruction, without extending the microcode.

Other objects and further features of the present invention will be apparent from the following detailed description when read in conjunction with the accompanying drawings.

BRIEF DESCRIPTION OF THE DRAWINGS

FIG. 23 is a time chart for explaining a case where the operation process instruction is executed by the microprocessor shown in FIG. 22;

DESCRIPTION OF THE PREFERRED EMBODIMENTS

Figure 1:
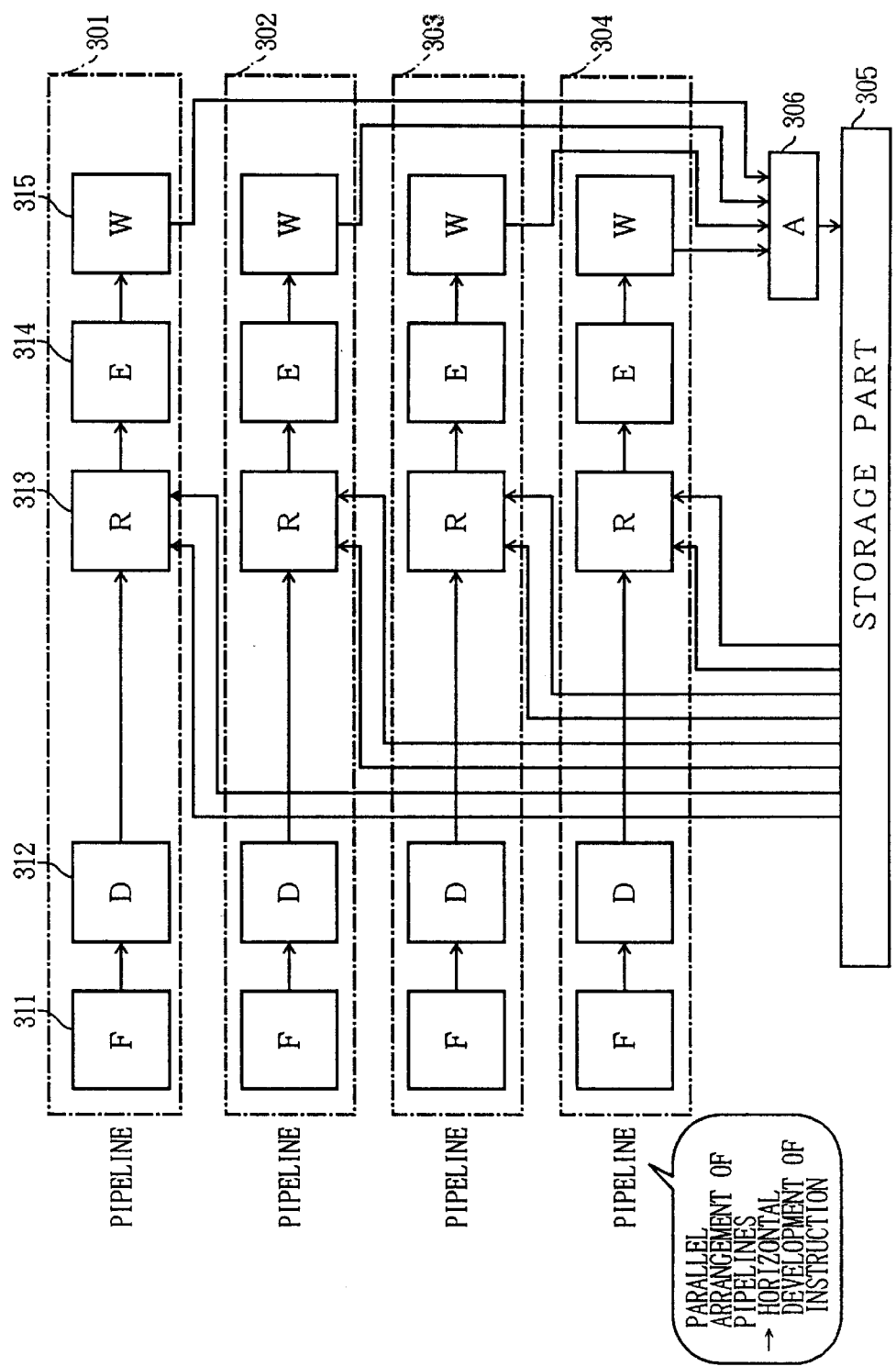
FIG. 1 is a diagram showing the construction of a conventional VLIW type microprocessor.

A description will hereinafter be given of an embodiment of a microprocessor according to the present invention, by referring to the drawings.

Figure 4:
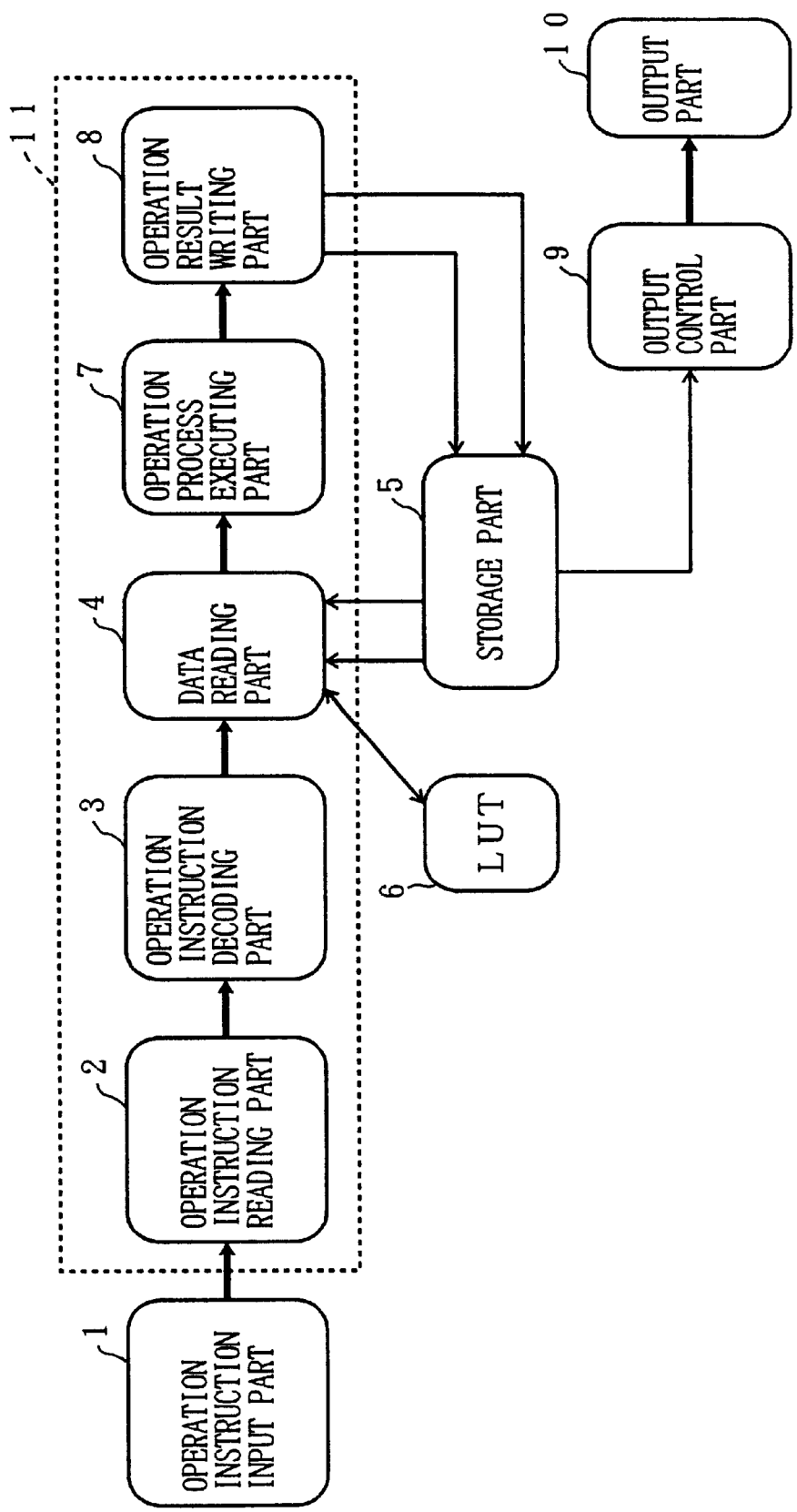
FIG. 4 is a diagram showing an embodiment of a microprocessor according to the present invention.

FIG. 4 shows the construction of the microprocessor according to the present invention.

In FIG. 4, because of the need to execute a large amount of operation processes at a high speed, this embodiment of the microprocessor includes a pipeline 11, an operation instruction input part 1, a storage part 5, a look up table (LUT) 6, an output control part 9, and an output part 10. The pipeline 11 includes an operation instruction reading part 2, an operation instruction decoding part 3, a data reading part 4, an operation process executing part 7, and an operation result writing part 8. The operation instruction input part 1 inputs a microcode with respect to the pipeline 11. The storage part 5 stores an operation result. The LUT 6 stores an operation process instruction code. The output control part 9 and the output part 10 are used to output an operation result and the like stored in the storage part 5. An operation process is efficiently executed by a pipeline process which executes the operation process in parallel. The LUT 6 is formed by a memory such as a RAM, and can be set arbitrarily by the user.

A description will be given of the functions of each of the parts forming the pipeline 11 of the microprocessor having the construction described above.

The operation instruction reading part 2 has a function of reading (fetching) a microcode which is made up of information which indicates transfer contents of input and output data necessary for an operation process, and address information (this address information will hereinafter be referred to as an operation ID) which indicates a process instruction or a storage location of a process instruction.

The operation instruction decoding part 3 has a function of decoding the microcode read by the operation instruction reading part 2.

The data reading part 4 has a function of reading from the storage part 5 the input data necessary for the operation process, based on the information which indicates the transfer contents of the input and output data of the microcode decoded in the operation instruction decoding part 3, and a function of reading the process instruction from the LUT 6 based on an address indicated by the operation ID, in a case where the microcode includes the operation ID.

The operation process executing part 7 includes a plurality of operation unit resources of addition, subtraction, multiplication, division, product-sum and the like, and has a function of executing a predetermined operation according to the process instruction and the input data read by the data reading part 4.

The operation result writing part 8 has a function of writing an operation result of the operation process executed by the operation process executing part 7 in the storage part 5, based on an address indicating the storage location of the output data obtained from the data reading part 4 via the operation process executing part 7.

The microprocessor having the construction and functions described above is capable of reading the process instruction based on the operation ID forming the microcode. For this reason, it is possible to cope with a complex and high-level operation process instruction code while realizing a short microcode.

Next, a description will be given of the microcode for executing the operation process in the microprocessor shown in FIG. 4, by referring to FIG. 5.

Figure 5:
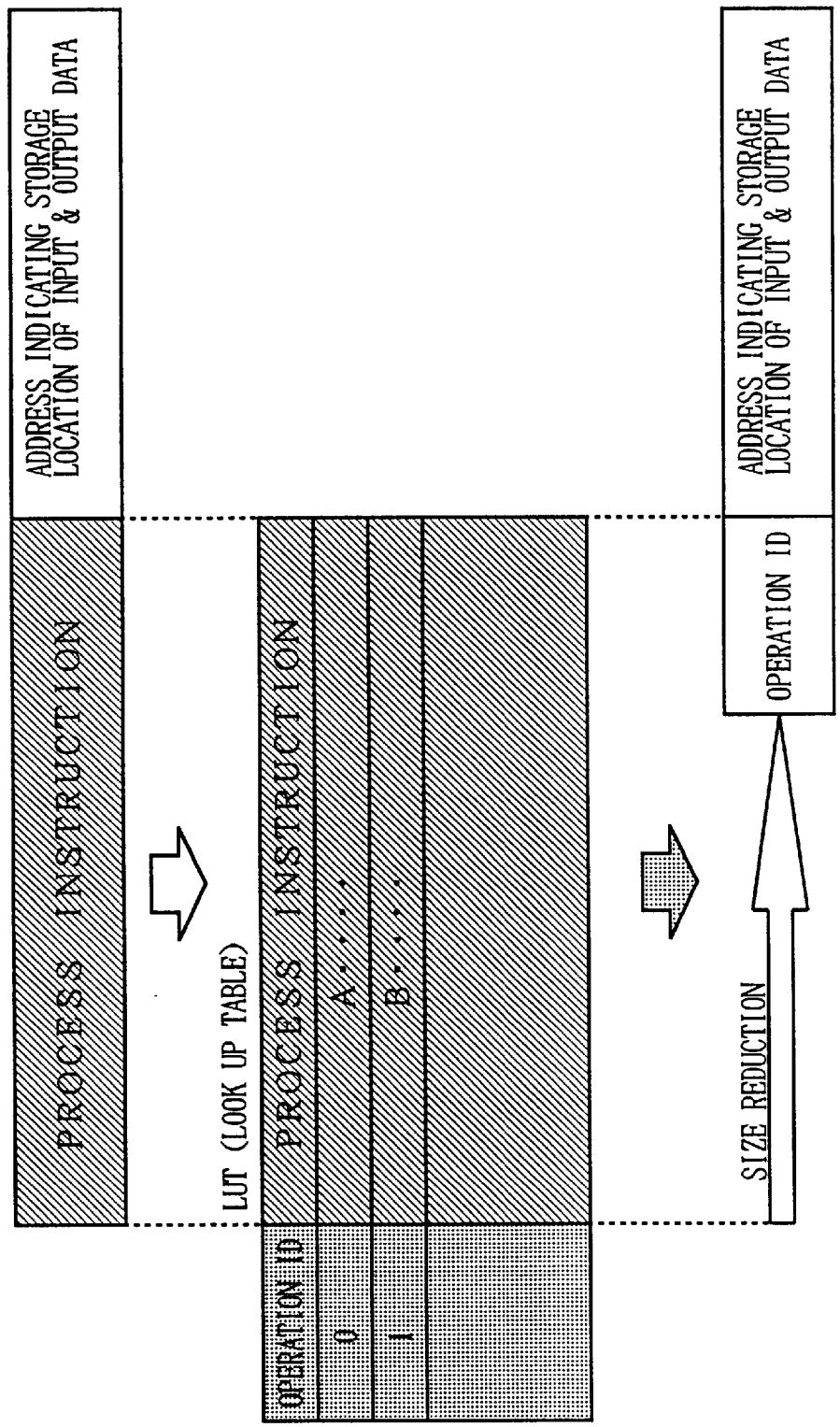
FIG. 5 is a diagram showing the construction of a microcode.

As shown in the upper part of FIG. 5, for example, the conventional microcode is made up of a process instruction (combined with a RISC type instruction) and input and output data. But as the microcode is extended due to the complexity and high level of the process instruction, operation process information may not be sufficiently allocated and implemented in the microcode.

Hence, the microcode for executing the operation process in this embodiment of the microprocessor is constructed to include the operation ID as shown in the lower part of FIG. 5, so that the microcode can be reduced even if the operation process is complex. As described above, the address information of the LUT 6 is indicated in the operation ID, and the complex and high-level process instruction is stored in the LUT 6.

Since the microcode is made up of the operation ID and the information which indicates the transfer contents of the input and output data, this embodiment of the microprocessor can use the LUT 6 and easily cope with a complex process instruction (an instruction subjected to an operation process by one pipeline) which is made up of a plurality of RISC type instructions (basic instructions which use only one operation unit resource). As a result, this embodiment of the microprocessor can easily cope with the complexity and high level of the operation process which will further increase in the future.

Figure 6:
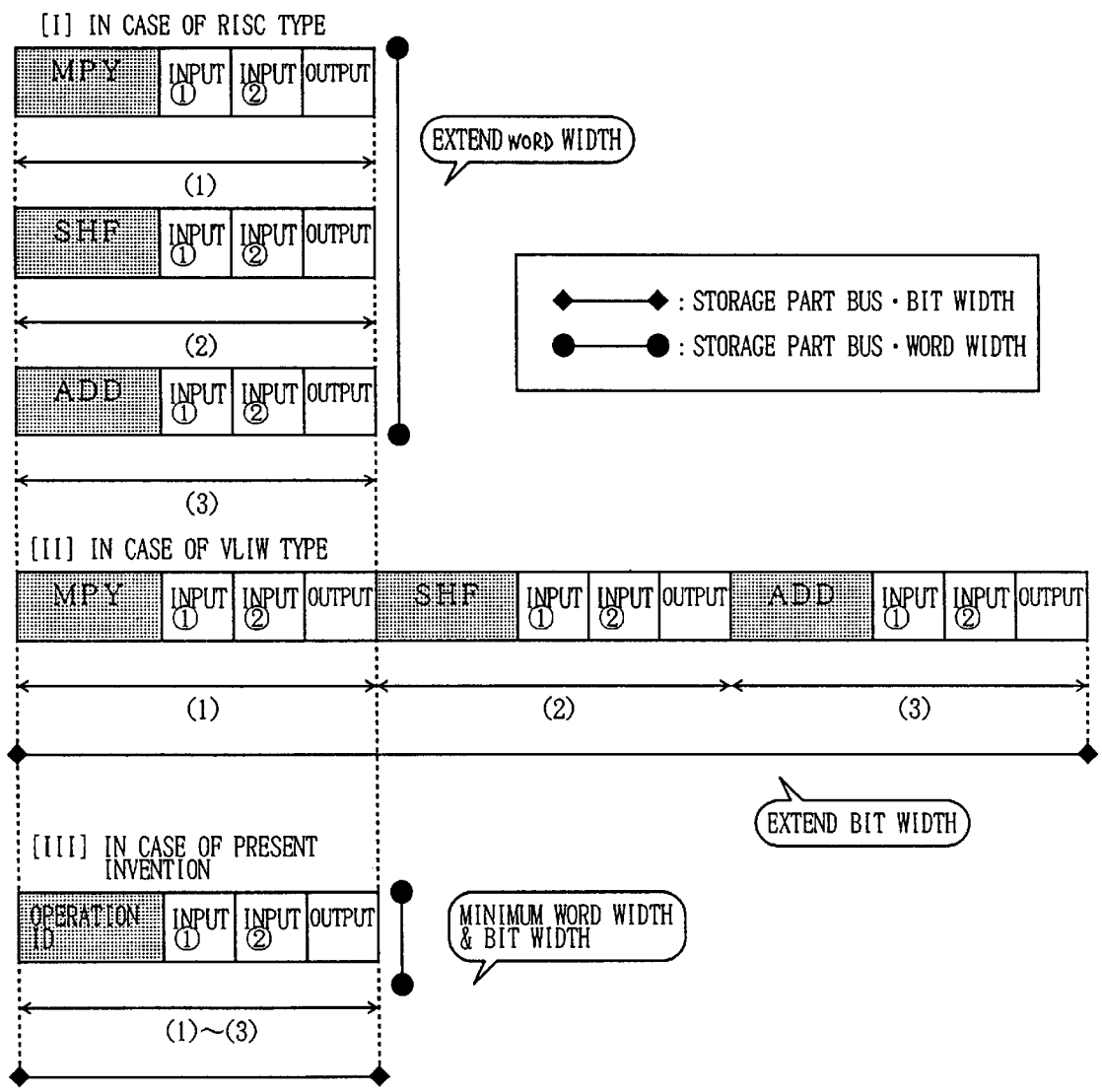
FIG. 6 is a diagram showing a comparison of the constructions of the microcode.

In addition, by reducing the microcode as shown in FIG. 5, it is possible to reduce an instruction cache which temporarily stores the instruction. Further, as shown in FIG. 6, the microcode used in the present invention has a reduced bit width and a reduced word width in the storage part 5 when compared to the conventionally used microcode.

Moreover, in this embodiment of the microprocessor, it is possible to directly implement the process instruction as in the conventional case, in place of the operation ID. For example, in a case where the process instruction is a single RISC type instruction, the RISC type instruction can be implemented as it is in place of the operation ID, because the microcode will not be extended thereby. In addition, depending on the size of the microcode, it is possible to directly implement two or more RISC type instructions. For this reason, this embodiment of the microprocessor can efficiently decode the operation process instruction without making access to the LUT 6.

This embodiment of the microprocessor according to the present invention may be constructed to include instruction decoding means for decoding a microcode made up of a basic instruction code and an ID indicating a storage location of an extended instruction code, and operation process executing means for executing an operation process by selecting operation unit resources based on an operation instruction decoded by said instruction decoding means, where a pipeline process is carried out by selecting a first operation unit resource by the basic instruction code and selecting a next operation unit resource by the extended instruction code. By setting the microcode in this manner, it is possible to provide a sufficient time margin for decoding the microcode which carries out a complex operation (like that of a CISC type). Hence, both the first operation of the microcode which carries out the complex operation and the simple operation like the RISC type instruction can be executed immediately, similarly to the case of the RISC type microprocessor.

Figure 7:
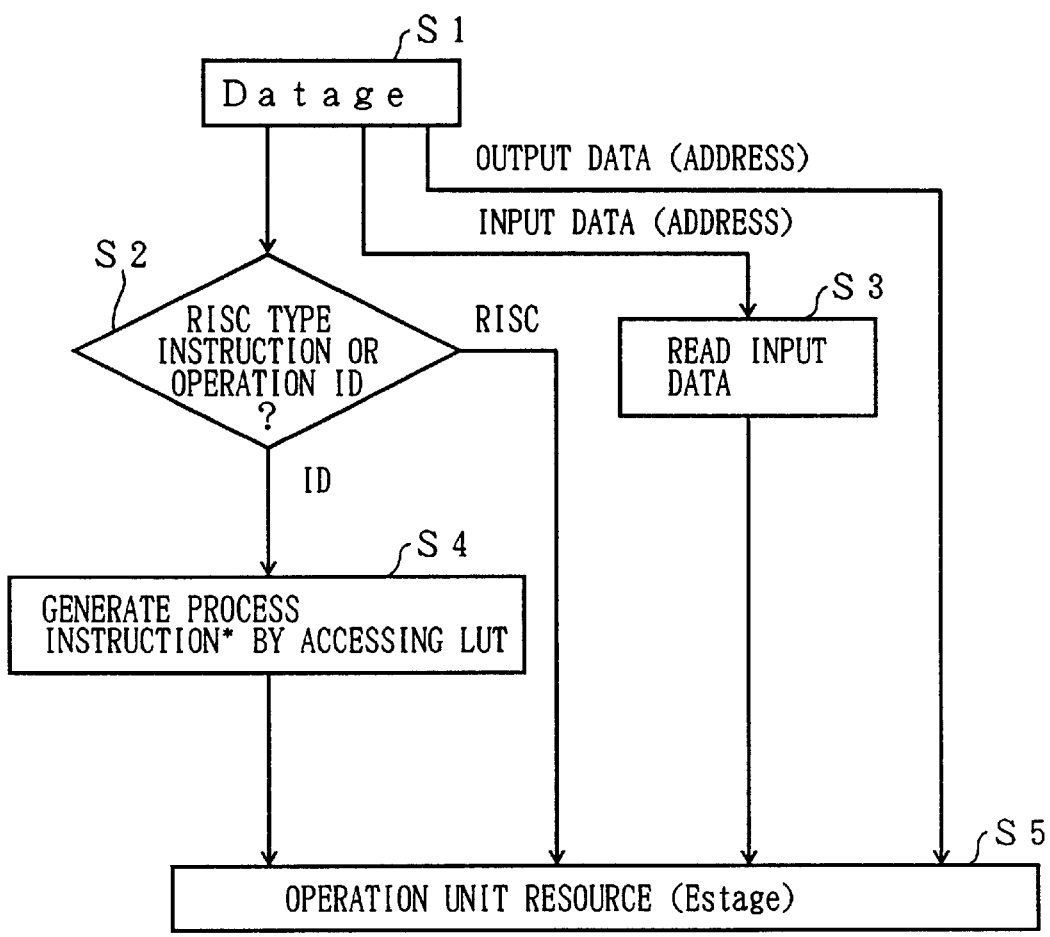
FIG. 7 is a flow chart showing an operation process execution method employed by the microprocessor.
Figure 8:
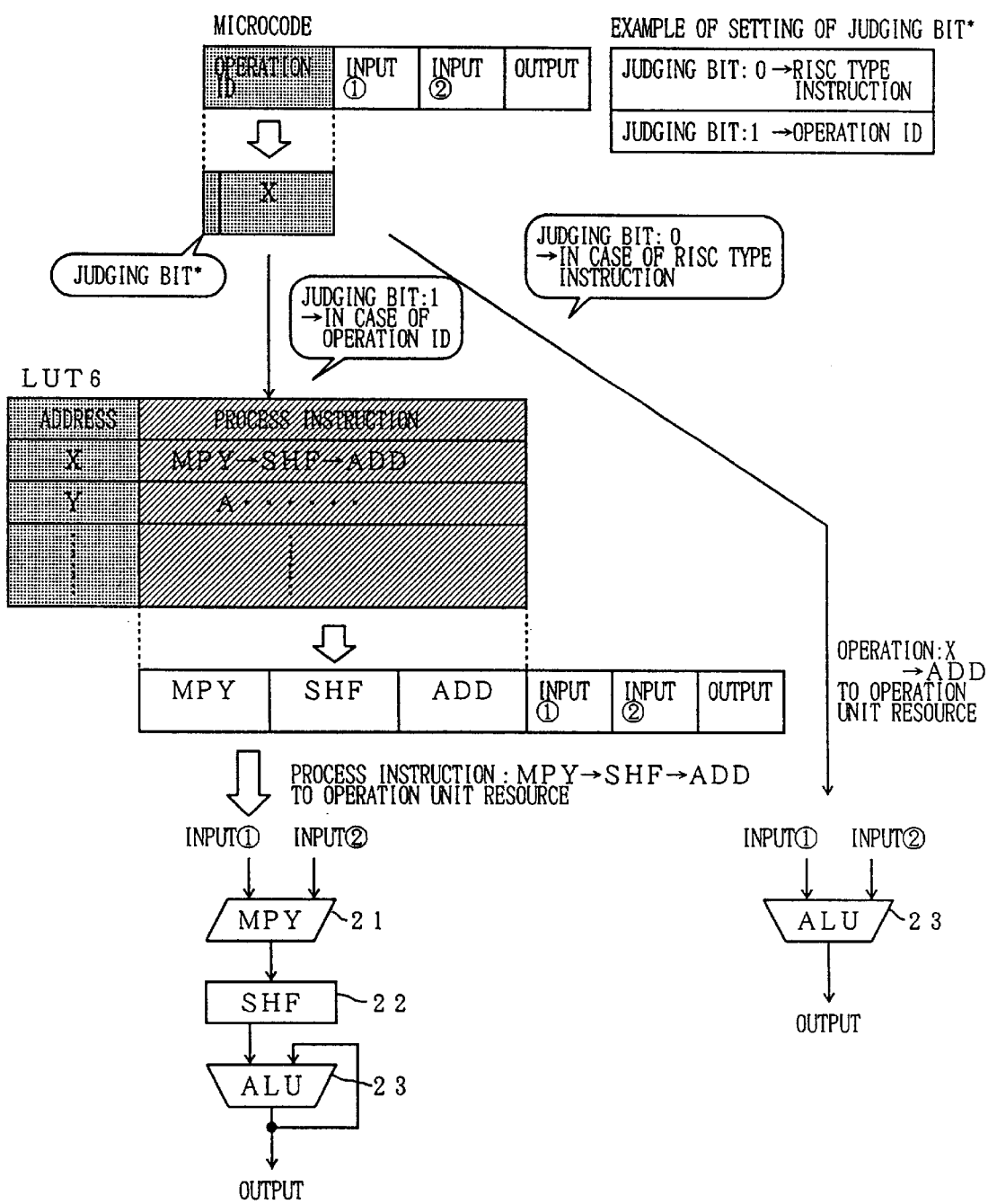
FIG. 8 is a diagram showing an operation process of the microprocessor.

FIGS. 7 and 8 respectively show an embodiment of an operation process execution method according to the present invention and a particular example of an operation process which is carried out in a case where the microcode shown in FIG. 5 is input to the microprocessor shown in FIG. 4.

When the pipeline 11 of the microprocessor shown in FIG. 4 is input with a microcode including information which indicates the transfer contents of the input and output data formed by address information which indicates a storage location of the output data, an input ①, an input data ②, and an operation ID shown in FIG. 8, for example, this microcode is read by the operation instruction reading part 2 and is decoded by the operation instruction decoding part 3, in a step S1.

If a judging bit of the operation ID is "1" as shown in FIG. 8 as a result of the decoding carried out in the operation instruction decoding part 3, a step S2 decides that the operation ID is a RISC type instruction. On the other hand, a step reads the input data ① and the input data ② from the storage part 5 by the data reading part 4, based on an address indicating the storage location of each of the input data ① and the input data ②. At the same time, the step S1 notifies the address which indicates the storage location of the output data to the operation process executing part 7.

In the operation process executing part 7, a step S5 carries out an adding operation by an ALU 23 (adder) which is an operation unit resource corresponding to the RISC type instruction, for example, and stores an operation result of this adding operation in the storage part 5 based on the address which indicates the storage location of the output data.

On the other hand, if the judging bit of the operation ID is "1" as shown in FIG. 8 as a result of the decoding carried out in the operation instruction decoding part 3, the step S2 decides that the operation ID is an address "X" (ID) of the LUT 6. Hence, a step S4 reads the process instruction by the data reading part 4 based on the address "X". Furthermore, the step S3 reads the input data ① and the input data ② from the storage part 5 by the data reading part 4, based on the address indicating the storage location of each of the input data ① and the input data ②. As a result, the process instruction, the input data ①, the input data ②, and the address indicating the storage location of the output data are notified to the operation process executing part 7. For example, the process instruction within the LUT 6 stores "MPY→SHF→ADD" at the address "X" as shown in FIG. 8.

In a step S5, the operation process executing part 7 carries out a product-sum by a multiplier (MPY) 21, a shifter (SHF) and the adder (ALU) 23 which are operation unit resources corresponding to the process instruction, for example, and stores the operation result in the storage part 5 based on the address which indicates the storage location of the output data.

This embodiment of the microprocessor which can carry out this embodiment of the operation process execution method, can efficiently execute the operation process by arbitrarily changing the contents of the LUT 6 by the user.

In addition, since this embodiment of the microprocessor executes a plurality of RISC type instructions in one process instruction, it is possible to reduce the number of instructions which are executed as a whole.

Figure 9:
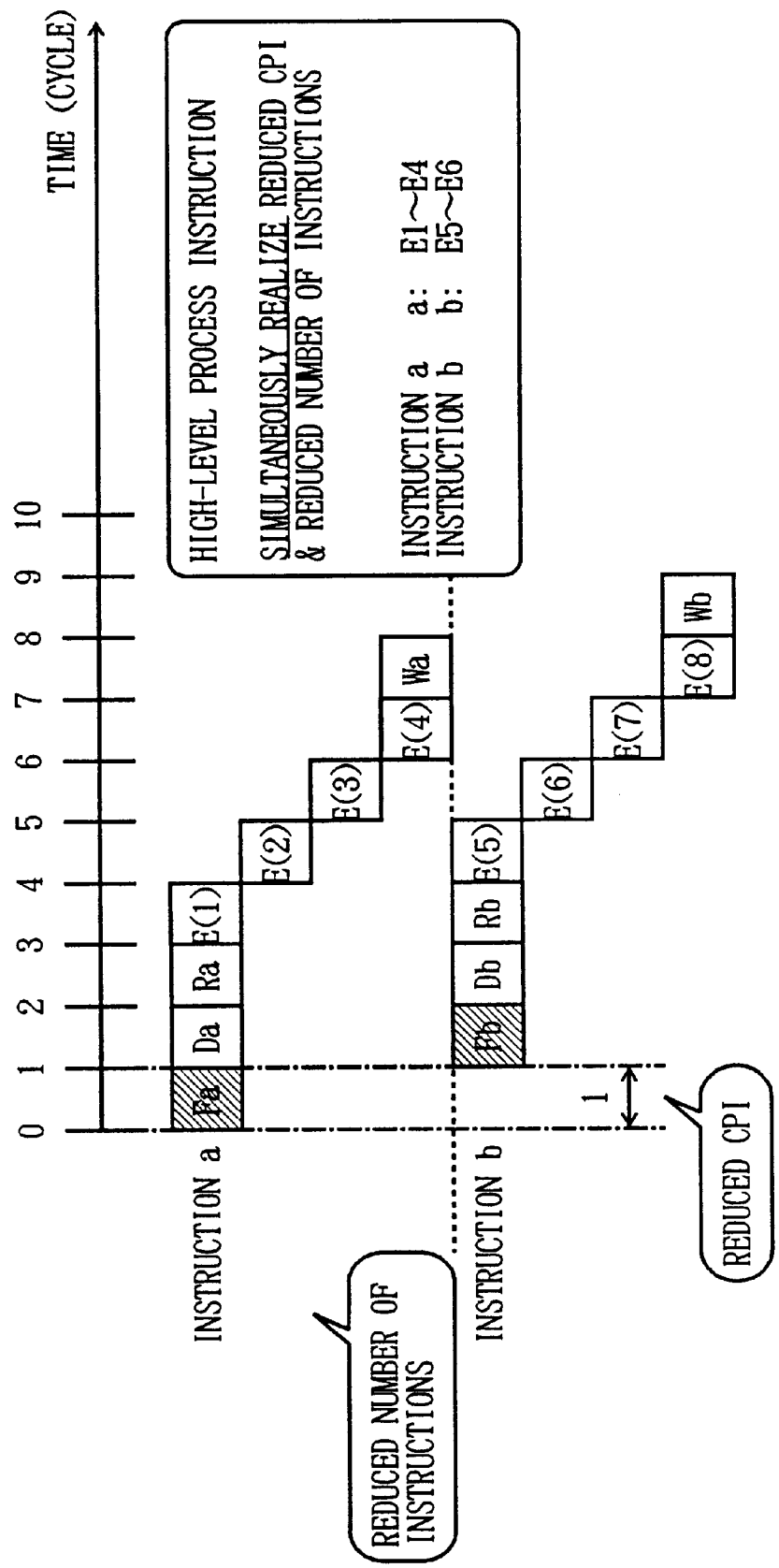
FIG. 9 is a diagram showing a reduction in CPI and number of instructions.

Next, a description will be given of the process of this embodiment of the microprocessor when executing a process instruction "a" and a process instruction "b" as shown in FIG. 9. In FIG. 9, Fa indicates a fetch cycle time of the process instruction "a", and Fb indicates a fetch cycle time of the process instruction "b". Da indicates a decoding time of RISC type instructions within the process instruction "a", and Db indicates a decoding time of RISC type instructions within the process instruction "b". Ra indicates a read time of input and output data of the process instruction "a", and Rb indicates a read time of input and output data of the process instruction "b". E(1) through E(4) respectively indicate execution times of the RISC type instructions within the process instruction "a", and E(5) through E(8) respectively indicate execution times of the RISC type instructions within the process instruction "b". Wa indicates a write time of an operation result of the process instruction "a", and Wb indicates a write time of an operation result of the process instruction "b". It is assumed for the sake of convenience that each of the process instructions "a" and "b" is made up of four RISC type instructions.

In this embodiment of the microprocessor, the process instruction "a" is fetched in one cycle (Fa), and a decoding process (Da), a read process (Ra), instruction executing processes (E(1) through E(4)), and a write process (Wa) are carried out in this sequence for the RISC type instructions within the process instruction "a", so that the process of the process instruction "a" ends in 8 cycles as shown in FIG. 9.

In addition, simultaneously as the decoding process (Da) after fetching the process instruction "a", this embodiment of the microprocessor fetches the next process instruction "b". Thereafter, the microprocessor carries out a decoding process (Db), a read process (Rb), instruction executing processes (E(5) through E(8)), and a write process (Wb) in this sequence for the RISC type instructions within the process instruction "b". Therefore, the processes of the process instruction "a" and the process instruction "b" are ended in a total of 9 cycles, as shown in FIG. 9.

Figure 2:
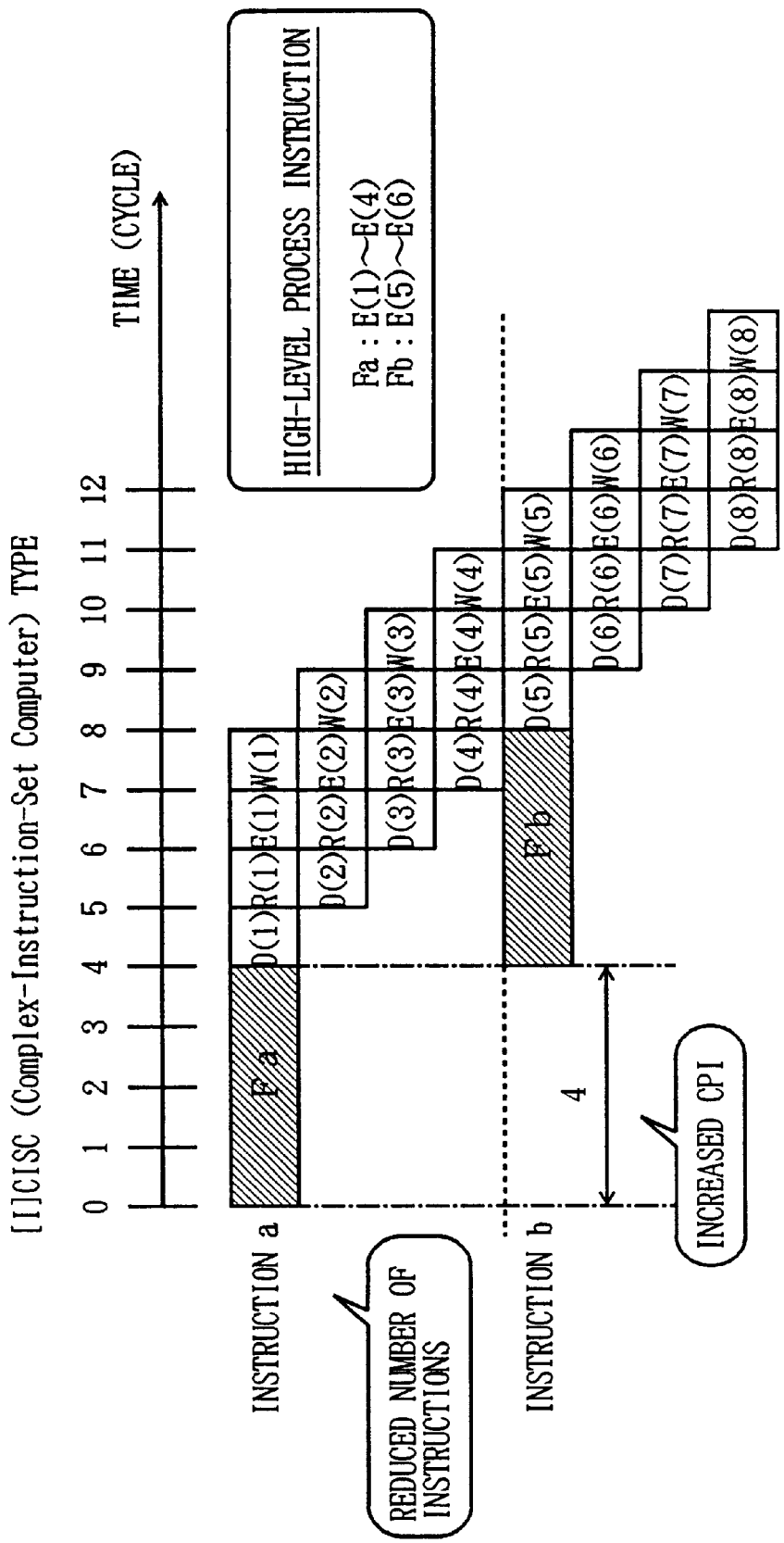
FIG. 2 is a diagram for explaining the reduction of instructions.
Figure 3:
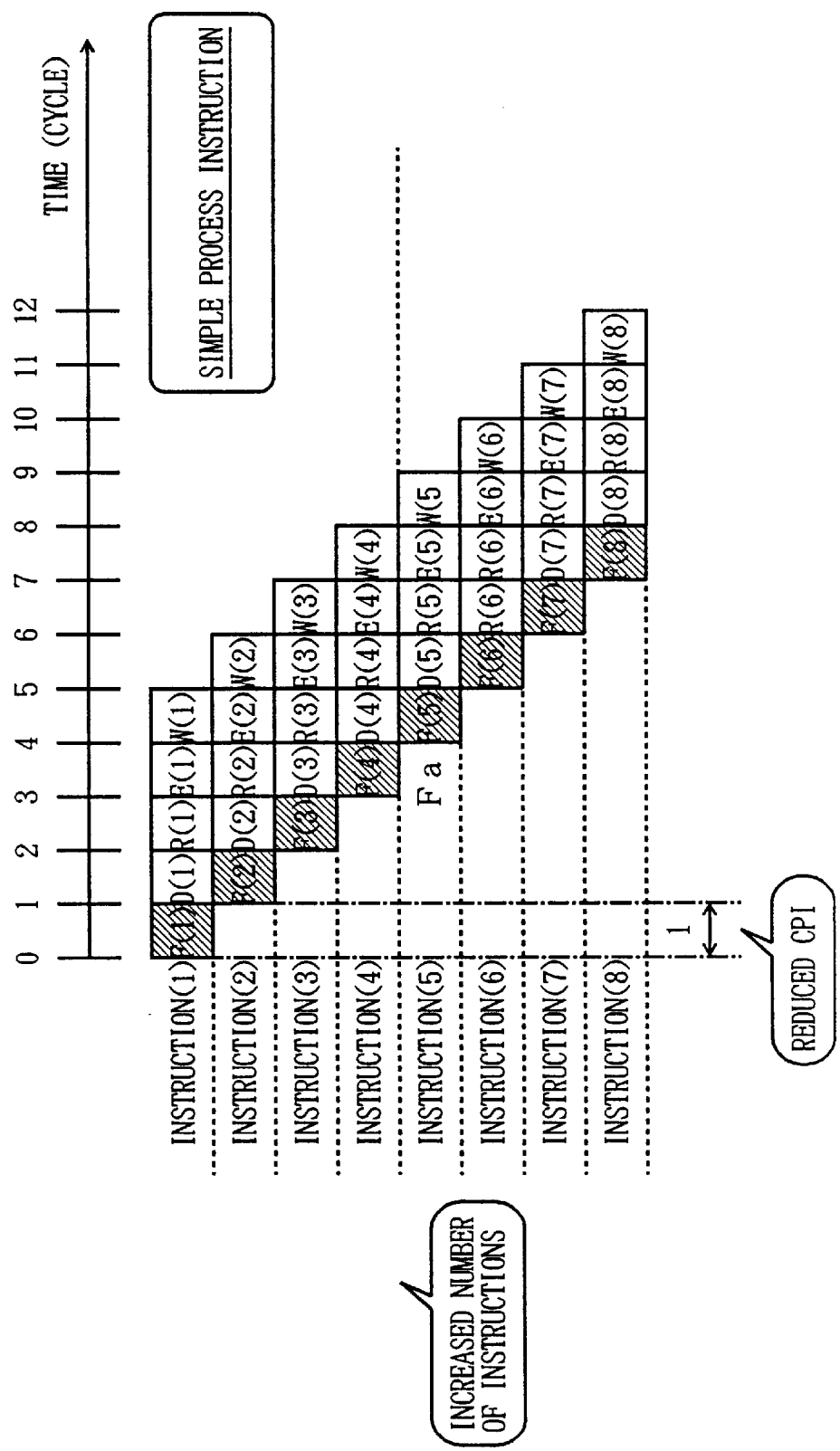
FIG. 3 is a diagram for explaining the reduction of the CPI.

By making one process instruction carry out a plurality of RISC type instructions, this embodiment of the microprocessor can reduce the number of instructions which are executed within the entire program, and also reduce the CPI at the same time, as compared to FIGS. 2 and 3. For this reason, it is possible to execute the operation process in a minimum number of cycles.

Next, a more detailed description will be given of the operation process executing part 7 which forms this embodiment of the microprocessor shown in FIG. 4.

Figure 10:
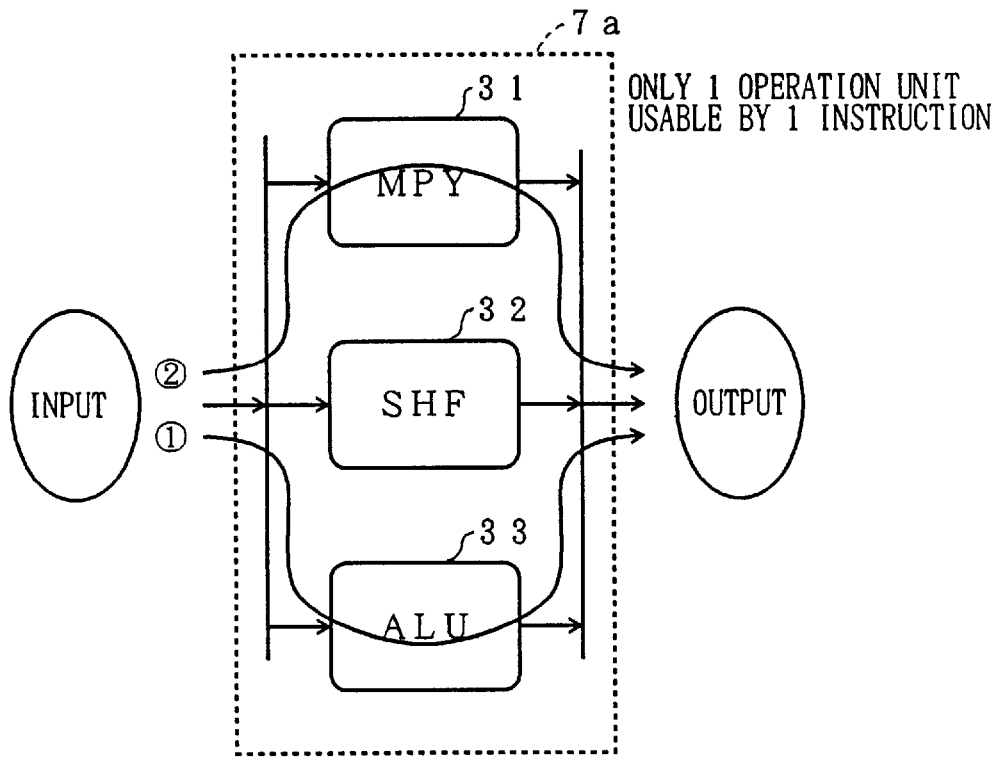
FIG. 10 is a diagram showing an operation process executing part capable of executing a RISC type instruction.

FIG. 10 shows an operation process executing part 7a which forms a conventional RISC type microprocessor.

For example, when carrying out an operation process of an operation process instruction (a+b)*b as shown in FIG. 10, the RISC type microprocessor divides the operation process instruction (a+b)*b into an instruction ①ALU(a+b) and an instruction ② MPY(*b), and carries out the operation process in sequence. Here, the instruction ①ALU(a+b) indicates that an addition a+b is carried out using an operation unit resource ALU 33, and the instruction ②MPY(*b) indicates that a multiplication of an operation result of the instruction ① and b is carried out using an operation unit resource MPY 31.

Figure 11:
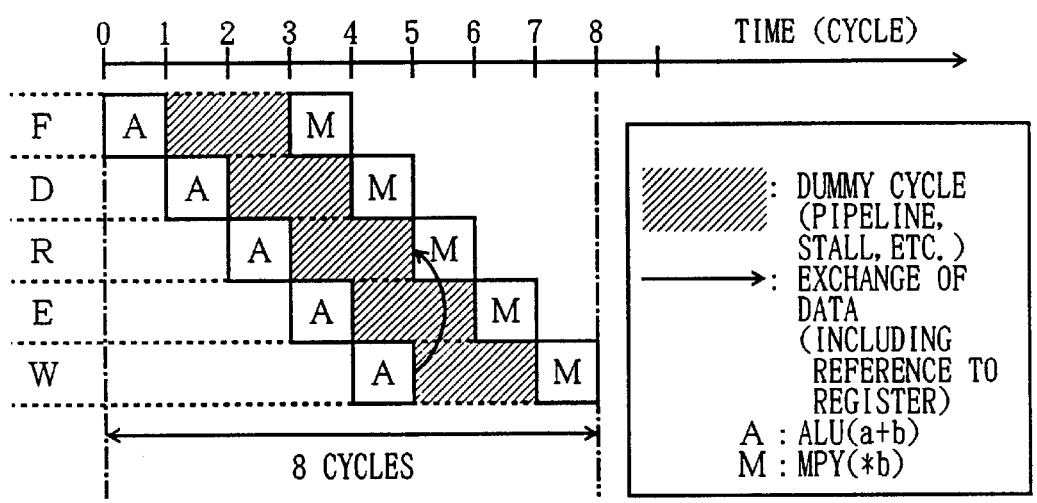
FIG. 11 is a time chart for explaining the operation process shown in FIG. 10.

As shown in FIG. 11, the RISC type microprocessor fetches the instruction ① ALU(a+b) in one cycle (F), and carries out a decoding process (D), a read process (R), an instruction executing process (E) and a write process (W) with respect to the instruction ① ALU(a+b) in this sequence. Hence, the process of the instruction ① ALU(a+b) ends in 5 cycles.

Furthermore, since the RISC type processor carries out the operation process of the instruction ② MPY(*b) based on the operation result of the instruction ① ALU(a+b), a dummy cycle is carried out (for example, a pipeline stall is generated) before fetching the next instruction ②MPY(*b) in one cycle (Fb), simultaneously as the instruction executing process (E) with respect to the instruction ①ALU(a+b). After fetching the instruction ② MPY(*b), a decoding process (D) is carried out with respect to the instruction ② MPY(*b). In addition, after the write process (W) to write the operation result of the instruction ① ALU(a+b) into a register ends, a read process (R) is carried out to read the operation result from the register. Thereafter, an instruction executing process (E) is carried out to execute the instruction ② MPY(*b), and a write process (W) is carried out to write the operation result of the instruction ② MPY(*b). Therefore, the operation process of the operation process instruction (a+b)*b ends in a total of 8 cycles, as shown in FIG. 11.

Figure 12:
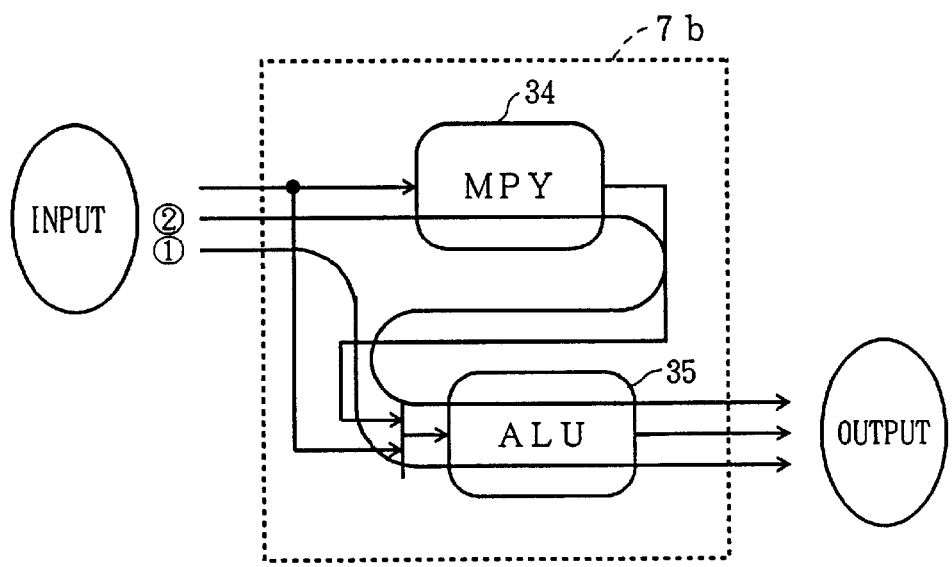
FIG. 12 is a diagram showing an operation process executing part capable of executing a MAC type instruction.

FIG. 12 shows an operation process executing part 7b which forms a conventional microprocessor having a MAC (product-sum) type structure, such as a digital signal processor (DSP).

For example, when carrying out an operation process of an operation process instruction (a+b)*b as shown in FIG. 12, the microprocessor having the MAC type structure divides the operation process instruction (a+b)*b into an instruction ① ALU(a+b) and an instruction ② MPY(*b), and carries out the operation process in sequence. Here, the instruction ① ALU(a+b) indicates that an addition a+b is carried out using an operation unit resource ALU 35, and the instruction ②MPY(*b) indicates that a multiplication of an operation result of the instruction ① and b is carried out using an operation unit resource MPY 34.

Figure 13:
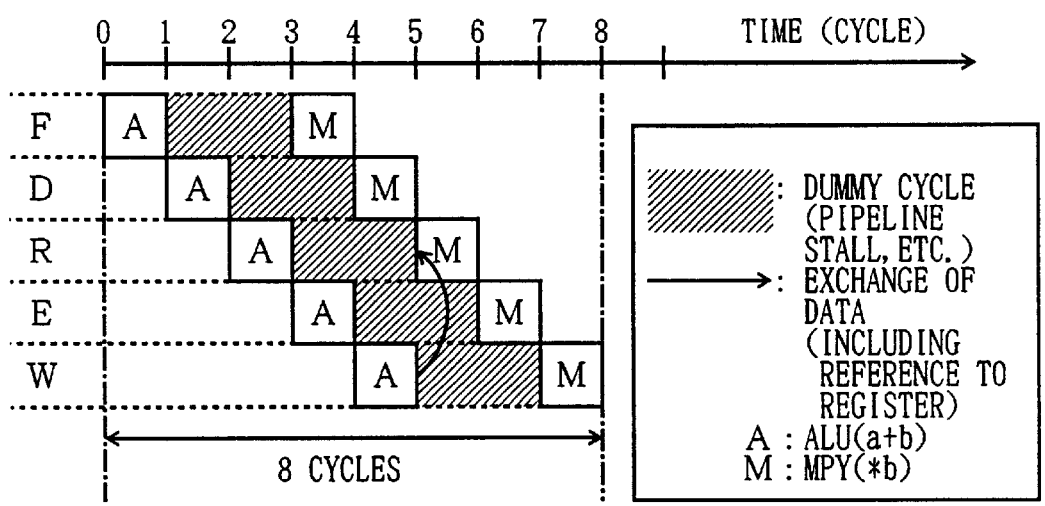
FIG. 13 is a time chart for explaining the operation process shown in FIG. 12.

As shown in FIG. 13, the microprocessor having the MAC type structure carries out the operation process of the operation process instruction (a+b)*b in a total of 8 cycles. The operation process of the operation process instruction (a+)*b is the same as that shown in the time chart of FIG. 11 described above, and a description thereof will be omitted.

Therefore, the two kinds of conventional microprocessors described above both generate the pipeline stall, and cannot execute the operation process in a minimum number of cycles.

Next, a description will be given of the operation process executing part 7 shown in FIG. 14 and forming this embodiment of the microprocessor which is capable of executing the operation process in a minimum number of cycles depending on the content of the operation process.

Figure 14:
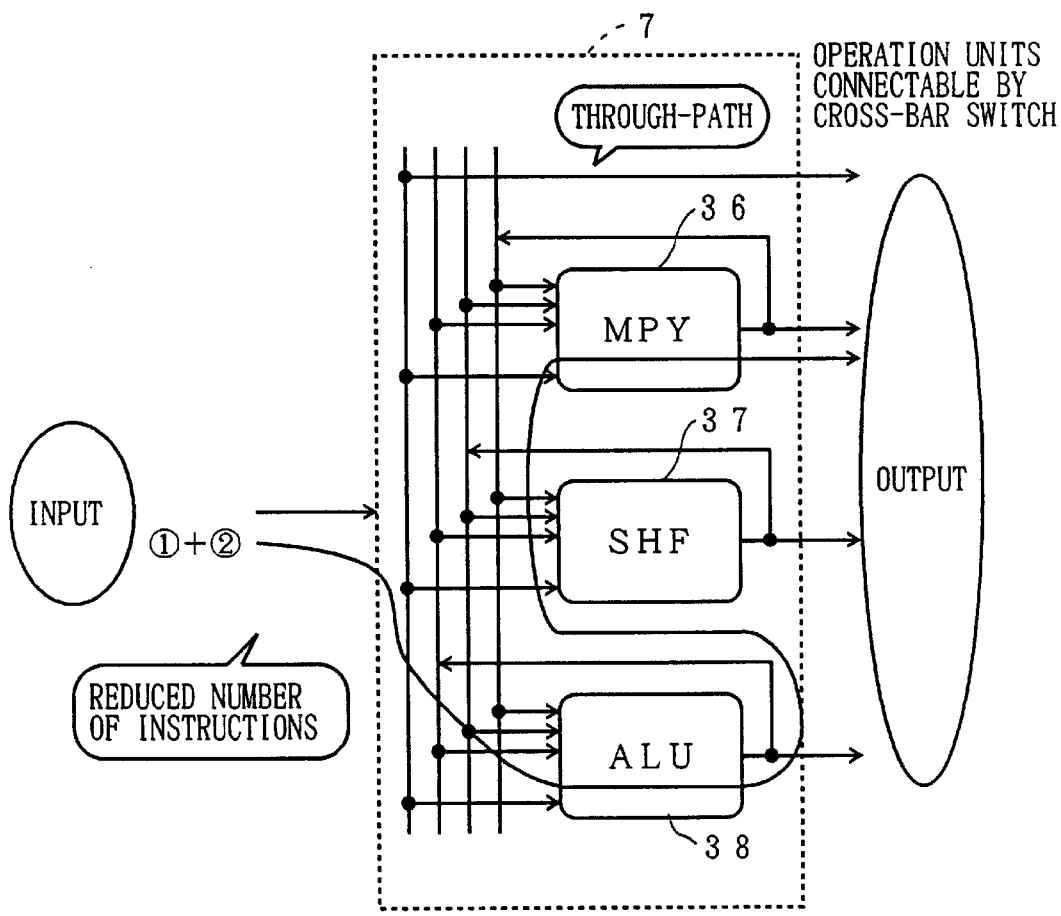
FIG. 14 is a diagram showing an operation process executing part of the present invention.

For example, when carrying out an operation process of an operation process instruction (a+b)*b as shown in FIG. 14, this embodiment of the microprocessor divides the operation process instruction (a+b)*b into an instruction ① ALU(a+b) and an instruction ② MPY(*b), and carries out the operation process in sequence. Here, the instruction ① ALU(a+b) indicates that an addition a+b is carried out using an operation unit resource ALU 38, and the instruction ② MPY(*b) indicates that a multiplication of an operation result of the instruction ① and b is carried out using an operation unit resource MPY 36.

Figure 15:
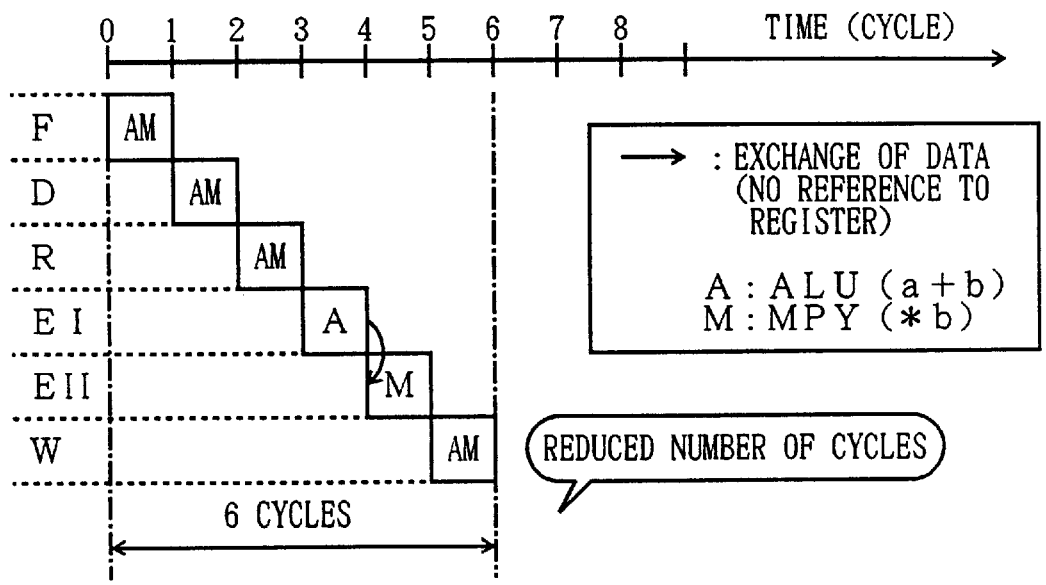
FIG. 15 is a time chart for explaining an operation process shown in FIG. 14.

As shown in FIG. 15, this embodiment of the microprocessor fetches in one cycle (F) a microcode including an operation ID which indicates the operation process instruction (a+b)*b, and address information of the input and output data. Then, a decoding process (D) decodes the microcode, and a read process (R) reads the operation ID which executes the operation process instruction (a+b)*b and the input and output data.

In this embodiment of the microprocessor, an executing process (EI) executes the operation process of the instruction ①ALU(a+b), but the operation result of this instruction ① ALU(a+b) is not output. Instead, the operation result of this instruction ① ALU(a+b) is input to the operation unit resource MPY 36 as shown in FIG. 15, and an executing process (EII) follows to execute the operation process of the instruction ② MPY(*b). Finally, a write process (W) is carried out to write the operation result of the instruction ②

MPY(*b). Therefore, the operation process of the operation process instruction (a+b)*b ends in a total of 6 cycles, as shown in FIG. 15.

In this embodiment of the microprocessor, an instruction which executes complex operation instructions within the same pipeline is developed vertically, and thus, it is unnecessary to make a reference to registers which hold intermediate operation results within the same pipeline. In addition, it is possible to exchange the operation results within the pipeline. As a result, a pipeline stall will not be generated. Consequently, this embodiment of the microprocessor can execute the operation process in minimum number of cycles depending on the content of the operation process.

Furthermore, this embodiment of the microprocessor change the sequence in which the operation unit resources are used and the number of operation unit resources used, by arbitrarily changing the contents of the LUT 6. Moreover, the input and output data are propagated via a throughpath when not using the operation unit resource. As a result, it is possible to efficiently execute the operation process.

Figure 16:
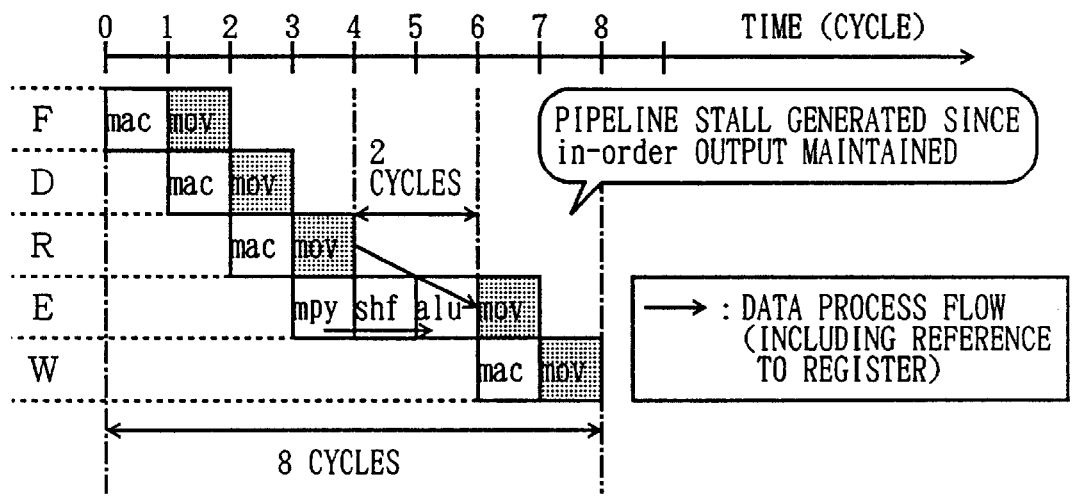
FIG. 16 is a time chart for a case where an operation process of an operation process instruction "(product-sum operation)→(move data)" is executed by the operation process executing part shown in FIG. 12.

FIG. 16 show a time chart for a case where an operation process of an operation process instruction "(product-sum operation)→(move data)", for example, is executed by the operation process executing part 7b of the microprocessor having the MAC type structure shown in FIG. 12. More particularly, the following operation process instructions are carried out, for example.

mac r2, r1, r0; MAC (product-sum operation): MPY→SHF→ALU mov r4, r3; MOV (move data): through-path As shown in FIG. 16, the microprocessor having the MAC type structure fetches the instruction MAC in one cycle (F). In addition, a decoding process (D),. a read process (R), and an executing process (E) are carried out with respect to the instruction MAC, in the sequence of MPY→SHF→ALU. Then, a write process (W) writes the operation result. Hence, the process of the instruction MAC ends in a total of 7 cycles.

Furthermore, after the instruction MAC is fetched, the microprocessor having the MAC type structure fetches the next instruction MOV in one cycle (F), simultaneously as the decoding process (D) with respect to the instruction MAC. A decoding process (D) and a read process (R) are carried out with respect to the instruction MOV. But since the microprocessor having the MAC type structure makes an in-order output, a pipeline stall is generated, and the instruction MOV cannot be executed until the operation process with respect to the instruction MAC ends.

After the pipeline stall amounting to 2 cycles ends, the microprocessor having the MAC type structure carries out an executing process (E) to execute the instruction MOV, and thereafter carries out a write process (W) via the through-path. As a result, the operation process of the operation process instruction "(product-sum operation)→(move data)" ends in a total of 8 cycles, as shown in FIG. 16.

Therefore, the pipeline stall amounting to 2 cycles is generated in the microprocessor having the MAC type structure, and the operation process cannot be executed in a minimum number of cycles depending on the content of the operation process.

Figure 17:
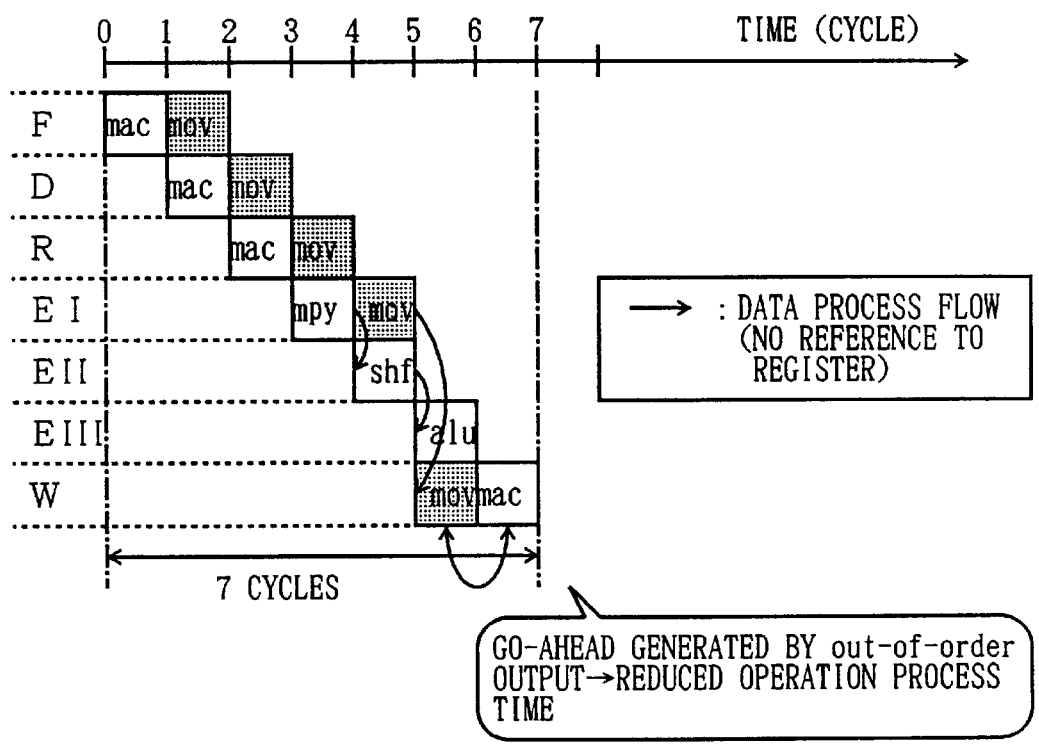
FIG. 17 is a time chart for a case where an operation process of an operation process instruction "(product-sum operation)→(move data)" is executed by the operation process executing part shown in FIG. 14.

FIG. 17 is a time chart for a case where an operation process of an operation process instruction "(product-sum operation)→(move data)", for example, is executed by the operation process executing part 7 of this embodiment of the microprocessor shown in FIG. 14. More particularly, an operation process instruction similar to that shown in FIG. 16 described above is carried out.

As shown in FIG. 17, this embodiment of the microprocessor fetches the instruction MAC in one cycle (F). In addition, a decoding process (D), a read process (R), and an executing process (E) are carried out with respect to the instruction MAC, in the sequence of MPY SHF ALU. Then, a write process (W) writes the operation result. Hence, the process of the instruction MAC ends in a total of 7 cycles.

Furthermore, after the instruction MAC is fetched, this embodiment of the microprocessor fetches the next instruction MOV in one cycle (F), simultaneously as the decoding process (D) with respect to the instruction MAC. A decoding process (D) and a read process (R) are carried out with respect to the instruction MOV.

In this embodiment of the microprocessor, it is possible to appropriately output the operation result which is obtained by executing the operation process in parallel, thereby enabling an out-of-order output. For this reason, a pipeline stall will not occur, and it is possible to execute the instruction MOV (carry out an executing process (E)) in parallel with the operation process of the instruction MAC, without waiting for the operation process of the instruction MAC to end.

In addition, after the instruction MOV is executed, this embodiment of the microprocessor carries out a write process (W) in a sequence in which the operation process ends. Therefore, the operation process of the operation process instruction "(product-sum operation)→(move data)" ends in a total of 7 cycles, as shown in FIG. 14. In the case of the operation process of the operation process instruction "(product-sum operation)→(move data)", the operation process of the instruction MOV ends before the operation process of the instruction MAC, and consequently, the operation process of the instruction MOV goes ahead of the operation process of the instruction MAC due to the effects of the out-of-order output.

Because this embodiment of the microprocessor employs the out-of-order output, it is possible to write the operation result in the sequence in which the operation process ends, without making a previously ended operation process wait. Accordingly, in this embodiment of the microprocessor, an operation process instruction can go ahead of, that is, pass, another operation process instruction, thereby making it possible to execute the operation process in a minimum number of cycles.

Figure 18:
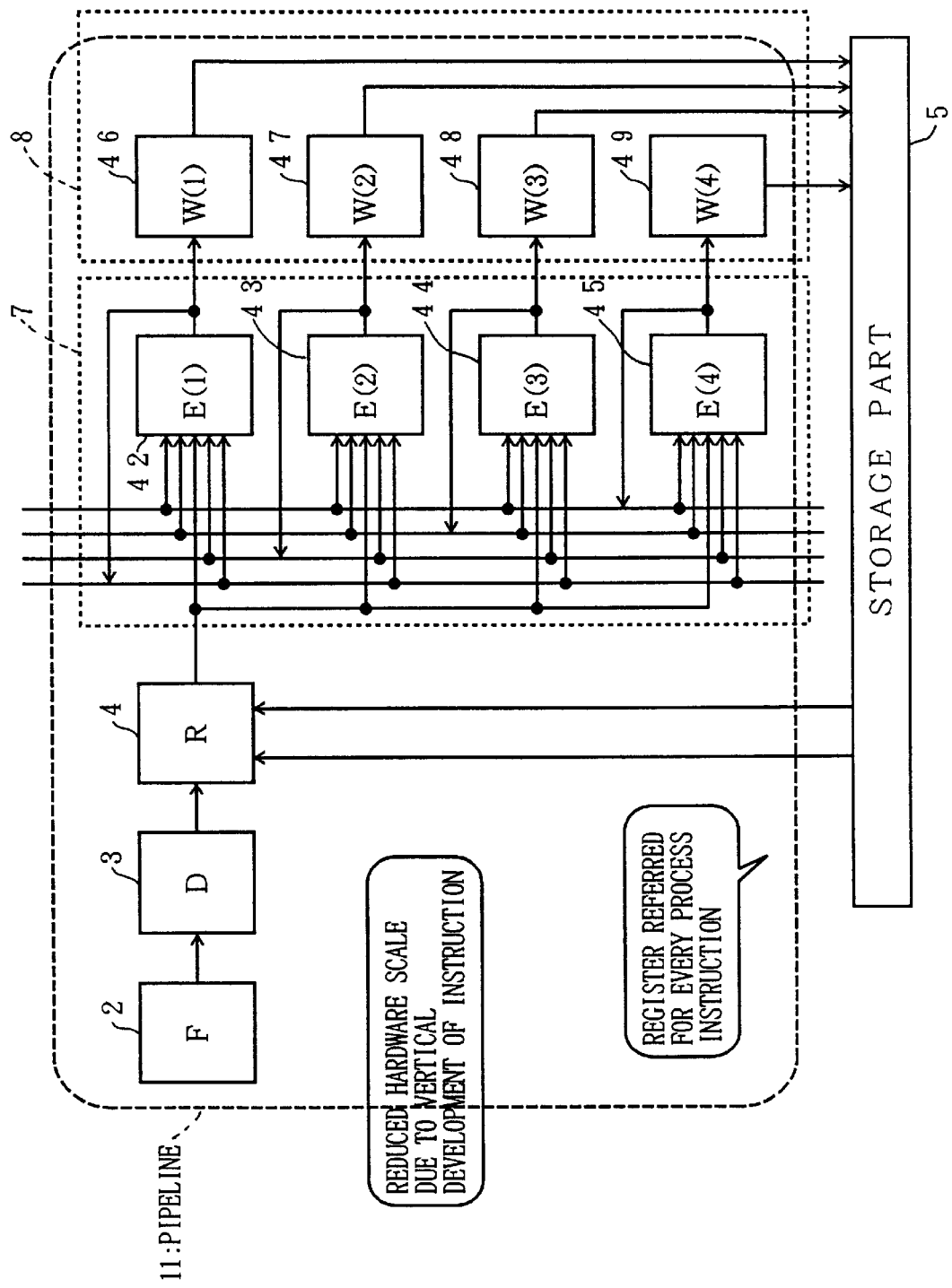
FIG. 18 is a diagram showing the construction of a pipeline in the present invention.

FIG. 18 shows a pipeline structure of this embodiment of the microprocessor. A description will now be given of the operation of this embodiment of the microprocessor having the pipeline structure for a case where a MAC type operation process instruction is repeatedly executed, based on a time chart shown in FIG. 19, and in comparison with the operation of the conventional microprocessor.

As described above in conjunction with FIG. 1, if the conventional microprocessor is made up of four kinds of pipelines 301, 302, 303 and 304, the operation result of each of the pipelines 301 through 304 is written in the storage part 305 and read into another pipeline via the storage part 305, thereby enabling exchange of the data among the pipelines 301 through 304. In other words, when using the operation result of one operation unit resource by a next operation unit resource, the conventional microprocessor always exchanges the operation result via the storage part 305.

In addition, when executing a process instruction having a combination of RISC type instructions, the operation process instruction is developed horizontally in each of the pipelines, and the operation process is executed by the parallel pipelines.

Figure 20:
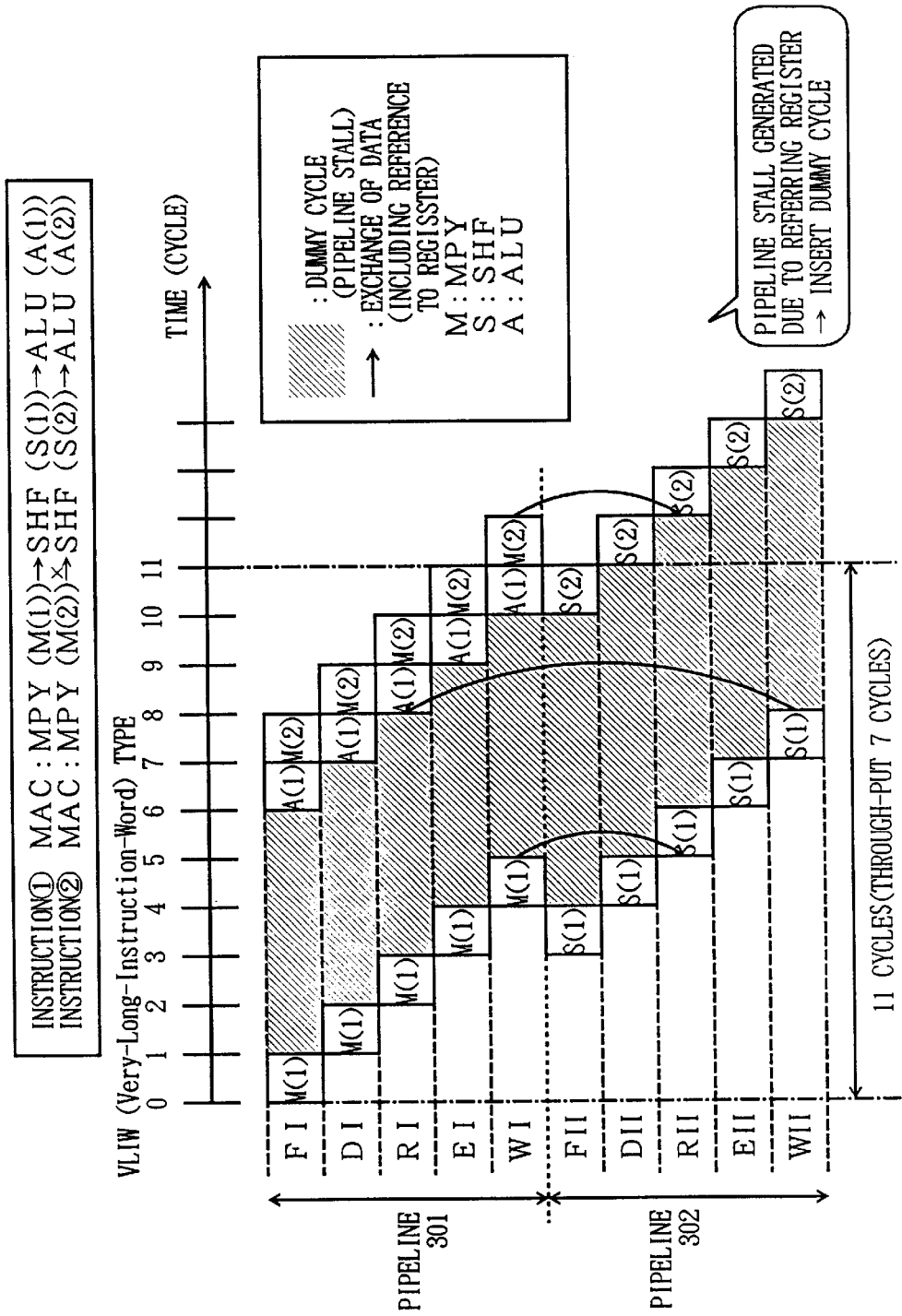
FIG. 20 is a time chart for explaining a case where a MAC type instruction is repeatedly executed by the pipeline structure of a conventional microprocessor.

FIG. 20 is a time chart for a case where the MAC type operation process instruction is repeatedly executed by the conventional microprocessor having the pipeline structure shown in FIG. 1. More particularly, FIG. 20 shows the case where the following operation process instructions are executed, for example.

instruction ①: MAC;
MPY(M(1))→SHF(S(1))→ALU(A(1))
instruction ②: MAC;
MPY(M(2))→SHF(S(2))→ALU(A(2))

As shown in FIG. 20, in the pipeline 301 of the conventional microprocessor, M(1) of the instruction ①: MAC is fetched in one cycle (FI). In addition, a decoding process (DI) decodes M(1) of the instruction ①: MAC, a read process (RI) reads the necessary input and output data, an executing process (EI) executes the operation of M(1), and a write process (WI) writes the operation result of M(1) in the storage part 305. Hence, the process of M(1) of the instruction ①: MAC ends in 5 cycles.

Next, in the pipeline 302 of the conventional microprocessor, S(1) of the instruction ①: MAC is fetched in one cycle (FII), simultaneously as the executing process (EI) with respect to M(1) of the instruction ①: MAC. In addition, a decoding process (DII) decodes S(1) of the instruction ①: MAC, and after the write process (WI) writes the operation result of M(1) of the instruction ①: MAC in the storage part 305, a read process (RII) reads the operation result within the storage part 305 and the necessary input and output data. Further, in the conventional microprocessor, an executing process (EII) executes the operation of S(1) of the instruction ①: MAC, and a write process (WII) writes the operation result of S(1) in the storage part 305. Hence, the operation processes of M(1) and S(1) of the instruction ①: MAC end in a total of 8 cycles, as shown in FIG. 20.

Finally, in the pipeline 301 of the conventional microprocessor, A(1) of the instruction ①: MAC is fetched in one cycle (FI), simultaneously as the executing process (EII) with respect to S(1) of the instruction ①: MAC. In addition, a decoding process (DI) decodes A(1) of the instruction ①: MAC, and after the write process (WII) writes the operation result of S(1) of the instruction ①: MAC in the storage part 305, a read process (RI) reads the operation result within the storage part 305 and the necessary input and output data. Further, in the conventional microprocessor, an executing process (EI) executes the operation of A(1) of the instruction ①: MAC, and a write process (WI) writes the operation result of A(1) in the storage part 305. Hence, the operation processes of M(1), S(1) and A(1) of the instruction ①: MAC end in a total of 11 cycles, as shown in FIG. 20. The instruction ②: MAC is executed similarly to the instruction ①: MAC described above. Moreover, a pipeline stall is generated in the pipeline 301 between M(1) of the instruction ①: MAC and A(1) of the instruction ①: MAC, and 5 dummy cycles are inserted for this reason.

Therefore, the conventional microprocessor cannot execute the operation process in a minimum number of cycles depending on the content of the operation process.

On the other hand, this embodiment can execute the operation process in a minimum number of cycles depending on the content of the operation process, by including a plurality of operation unit resources in one pipeline, as shown in FIG. 18.

In FIG. 18, the construction of the pipeline 11 of the microprocessor is the same as that shown in FIG. 4. The pipeline 11 includes the operation instruction reading part 2, the operation instruction decoding part 3, the data reading part 4, the operation process executing part 7, and the operation result writing part 8. A pipeline process executes the operation process in parallel within one pipeline 11, so as to efficiently execute the operation process. For this reason, compared to the conventional microprocessor shown in FIG. 1, this embodiment of the microprocessor can reduce the scale of the hardware and also reduce the power consumption by reducing the number of pipelines.

In the pipeline 11, the operation process executing part 7 is formed by a plurality of operation unit resources 42, 43, 44 and 45 which are arbitrarily connectable, by modifying the operation process instruction code within the LUT 6. Hence, by modifying the LUT 6, the sequence in which the operation unit resources are used and the number of operation unit resources used can be changed arbitrarily, thereby making it possible to efficiently execute the operation process.

In addition, in the pipeline 11, the operation result writing part 8 has a multi-port structure for independently writing the operation results of the operation unit resources 42, 43, 44 and 45 in the storage part 5, and the operation result writing part 8 includes writing parts 46, 47, 48 and 49 in correspondence with the operation unit resources 42, 43, 44 and 45. Using the in-order execution and out-of-order output of the operation process executing part 7, it is possible to avoid conflict of the writing of the operation results of the operation unit resources 42, 43, 44 and 45.

Figure 19:
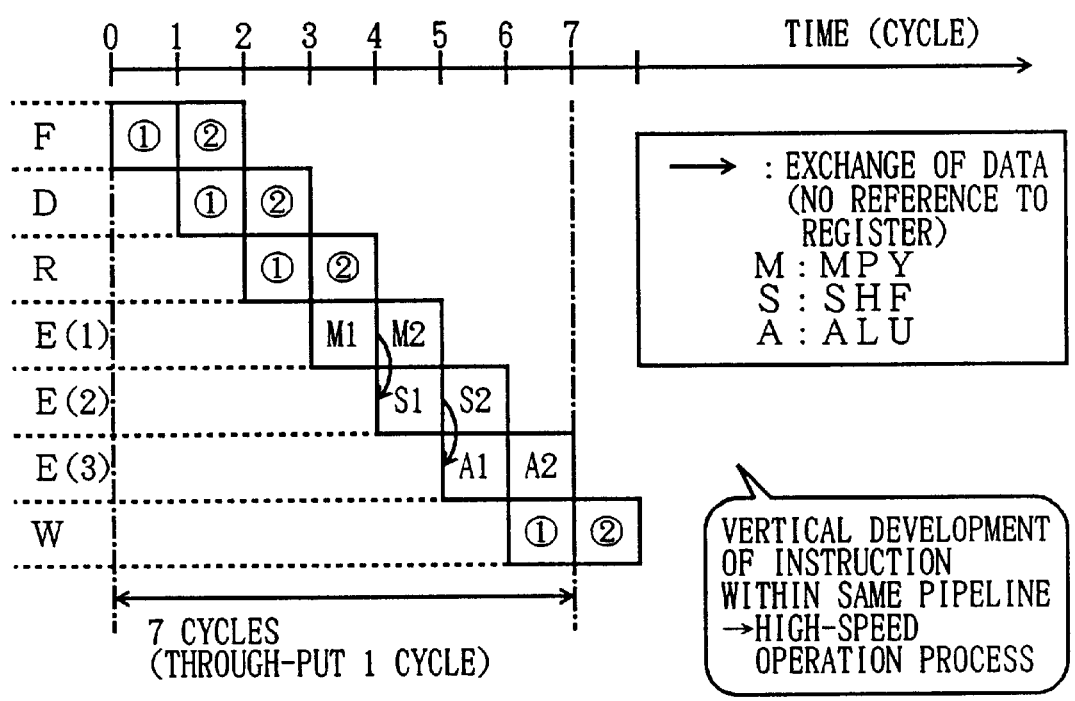
FIG. 19 is a time for explaining a case where a MAC type instruction is repeatedly executed by the pipeline structure of the microprocessor shown in FIG. 18.

FIG. 19 is a time chart for a case where the MAC type operation process instruction is repeatedly executed by this embodiment of the microprocessor having the construction shown in FIG. 18. More particularly, FIG. 19 shows the case where the following operation process instructions are executed, for example.

instruction ①: MAC;
MPY(M(1))→SHF(S(1))→ALU(A(1))
instruction ②: MAC;
MPY(M(2))→SHF(S(2))→ALU(A(2))

As shown in FIG. 19, in the pipeline 11 of this embodiment of the microprocessor, M(1), S(1) and A(1) of the instruction ①: MAC are fetched in one cycle (F). In addition, a decoding process (D) decodes the instruction ①: MAC, a read process (R) reads all of the input and output data necessary for the instruction ①: MAC and the address indicated by the operation ID.

For example, an executing process (E(1)) executes the operation of M(1) of the instruction ①: MAC in the operation unit resource 42. In addition, the operation result of the operation unit resource 42 is input directly to the next operation unit resource 43, for example, and an executing process (E(2)) executes the operation of S(1) of the instruction ①: MAC in the operation unit resource 43. Then, the operation result of the operation unit resource 43 is input directly to the next operation unit resource 44, for example, and an executing process (E(3)) executes the operation of A(1) of the instruction ①: MAC in the operation unit resource 44.

Finally, a write process (W) writes only the final operation result in the storage part 5 by the write part 48. Hence, the operation processes of M(1), S(1) and A(1) of the instruction ①: MAC end in a total of 7 cycles as shown in FIG. 19. The instruction ②: MAC is executed similarly to the instruction ①: MAC described above.

Therefore, according to this embodiment of the microprocessor, unlike the conventional microprocessor, no pipeline stall is generated, and it is possible to execute the operation process in a minimum number of cycles.

Figure 21:
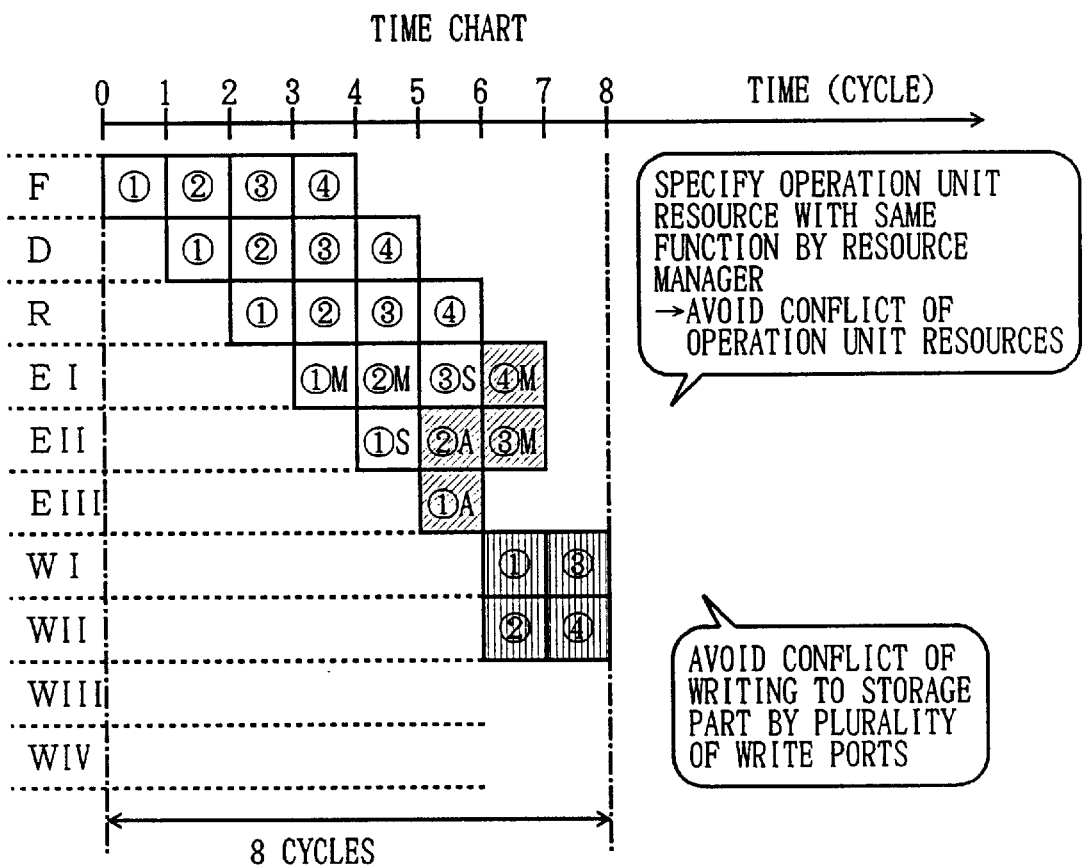
FIG. 21 is a diagram showing a conflict resolution process for a case where a conflict of operation unit resources occur in the pipeline structure of the microprocessor shown in FIG. 18.

FIG. 21 shows a time chart for a case where the pipeline structure of this embodiment of the microprocessor includes a plurality of operation unit resource having the same functions, and a conflict occurs among the operation unit resources when an operation process instruction is repeatedly executed. More particularly, FIG. 21 shows the case where the following operation process instructions are executed, for example.

instruction ①: op1 r2, r1, r0; op1: MPY→SHF→ALU
   instruction ②: op2 r5, r4, r3; op2: MPY→ALU
   instruction ③: op3 r8, r7, r6; op3: SHF→MPY
   instruction ④: op4 r11, r10, r9; op4: MPY As shown in FIG. 21, in the pipeline 11 of this embodiment of the microprocessor, the instruction ①: op1 is fetched in one cycle (F), the instruction ②: op2 is fetched in one cycle (F), the instruction ③: op3 is fetched in one cycle (F), and the instruction ④: op4 is fetched in one cycle (F), in this sequence.

After fetching the instruction ①: op1, a decoding process (D) decodes the instruction ①: op1, and a read process (R) reads all of the input and output data necessary for the instruction ①: op1 and the address indicated by the operation ID. A decoding process (D) and a read process (R) are similarly carried out with respect to the instruction ②: op2, the instruction ③: op3, and the instruction ④: op4.

After all of the input data necessary for the instruction ①: op1 and the process instruction indicated by the operation ID are read, this embodiment of the microprocessor carries out an executing process (EI) at a fourth cycle to execute the operation of the instruction ①: op1 by the operation unit resource MPY. Furthermore, the operation result of the operation unit resource MPY is input directly to the next operation unit resource SHF.

An executing process (EII) is carried out in a fifth cycle to execute the operation of the instruction ①: op1 by the operation unit resource SHF, and the operation result of the operation unit resource SHF is input directly to the next operation unit resource ALU. At the same time, in this fifth cycle, an executing process (EI) is carried out to execute the operation of the instruction ②: op2 by the operation unit resource MPY, and the operation result of the operation unit resource MPY is input directly to the next operation unit resource ALU. However, since a conflict occurs with respect to this next operation unit resource ALU, the operation result of the operation unit resource MPY is input for example to an operation unit resource ALU→ having the same function.

Furthermore, an executing process (EIII) is carried out in a sixth cycle to execute the operation of the instruction ①: op1 by the operation unit resource ALU, and for example, the writing part 46 carries out a write process (WI) in a seventh cycle to write the operation result of the operation unit resource ALU in the storage part 5. At the same time, in the sixth cycle, an executing process (EII) is carried out to execute the operation of the instruction ②: op2 by the operation unit resource ALU→, and for example, the writing part 46 carries out a write process (WII) in a seventh cycle to write the operation result of the operation unit resource ALU→ in the storage part 5. Moreover, at the same time, in the sixth cycle, an executing process (EI) is carried out to execute the operation of the instruction ③: op3 by the operation unit resource SHF, and the operation result of the operation unit resource SHF is input directly to the next operation unit resource MPY.

In addition, an executing process (EII) is carried out in the seventh cycle to execute the operation of the instruction ③: op3 by the operation unit resource MPY, and for example, the writing part 46 carries out a write process (WI) in an eighth cycle to write the operation result of the operation unit resource MPY in the storage part 5. At the same time, in the seventh cycle, an executing process (EI) is carried out to execute the operation of the instruction ④: op4 by an operation unit resource MPY→, for example, having the same function as the operation unit resource MPY. Next, in the eighth cycle, the writing part 47, for example, carries out a write process (WII) to write the operation result of the operation unit resource MPY→ in the storage part 5.

Therefore, this embodiment of the microprocessor can end the operation process of the instruction ①: op1, the instruction ②: op2, the instruction ③: op3, and the instruction ④: op4 in a total of 8 cycles, as shown in FIG. 21.

Accordingly, a pipeline stall will not be generated when a conflict of the operation unit resources occurs or, when a conflict of the writing of the operation results to the storage part 5 occurs. As a result, it is possible to execute the operation process in a minimum number of cycles depending on the content of the operation process.

Figure 22:
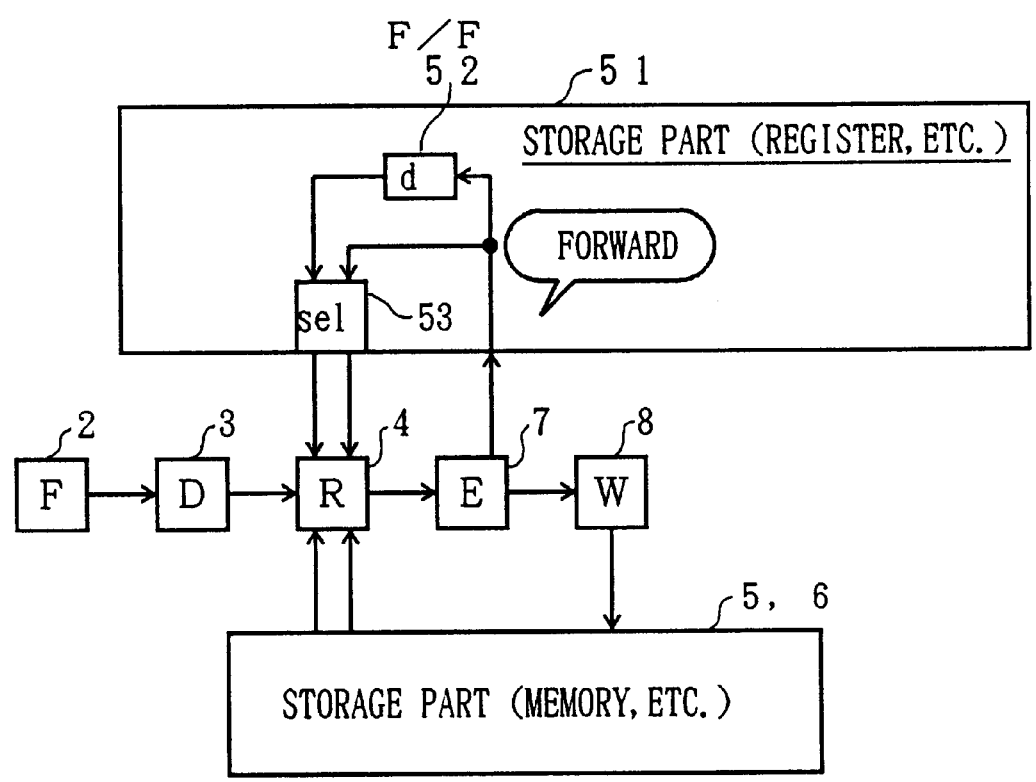
FIG. 22 is a diagram showing the hardware construction of the microprocessor capable of reducing the operation process time by forwarding the operation result.

FIG. 22 shows the hardware construction of another embodiment of the microprocessor according to the present invention, capable of reducing the time required to carry out the operation process by forwarding the operation result.

In FIG. 22, a microprocessor includes, in addition to the elements shown in FIG. 4, a storage part 51. This storage part 51 includes a path for notifying the operation result of the operation process executing part 7 directly to the data reading part 4, simultaneously as the writing of the operation result of the operation process executing part 7 in the storage part 5, and a path for notifying the operation result to the data reading part 4 after latching the operation result. The storage part 51 is provided with a flip-flop 52 which latches the forwarded operation result, and a selector 53 which selects the path which directly notifies the operation result or the path which notifies the operation result after latching the operation result.

In this embodiment of the microprocessor, when using the operation result of a previous operation process instruction in a next operation process instruction, the data reading part 4 reads the operation result from one of the paths described above, without using the operation result of the previous operation process instruction written in the storage part 5.

For this reason, this embodiment of the microprocessor does not require the storage part 5 intervene the exchange of the operation result, and the operation process can be executed in a minimum number of cycles.

FIG. 23 shows a time chart for a case where the operation processes of the instruction ① and the instruction ②, for example, are executed by the operation process executing part 7 of the microprocessor shown in FIG. 22. More particularly, FIG. 23 shows the case where the following operation process instructions are executed.

instruction ①: mov r2, r1; mov: move
   instruction ②: add r3, r0, r2; add: add

As shown in FIG. 23, this embodiment of the microprocessor fetches the instruction ① in one cycle (F). In addition, a decoding process (D) is carried out to decode the instruction ①, a read process (R) is carried out to read the data necessary for the operation process of the instruction ①, and an executing process (E) is carried out to execute the instruction ①.

Furthermore, after fetching the instruction ①, and simultaneously as the decoding process (D) with respect to the instruction ①, the microprocessor fetches the instruction ② in once cycle (F). Then, a decoding process (D) is carried out to decode the instruction ②, and a read process (R) is carried out to read the data necessary for the operation process of the instruction ②. Since the instruction ② uses as the input the operation result within r2 where the operation result of the instruction ① is written, the data reading part 4 uses the path within the storage part 51 and reads the operation result of the instruction ① by forwarding the operation result of the instruction ①.

In this state, the microprocessor carries out an executing process (E) to execute the operation process of the instruction ②, and carries out a write process (W) to write the operation result of the instruction ② in the storage part 5.

Figure 24:
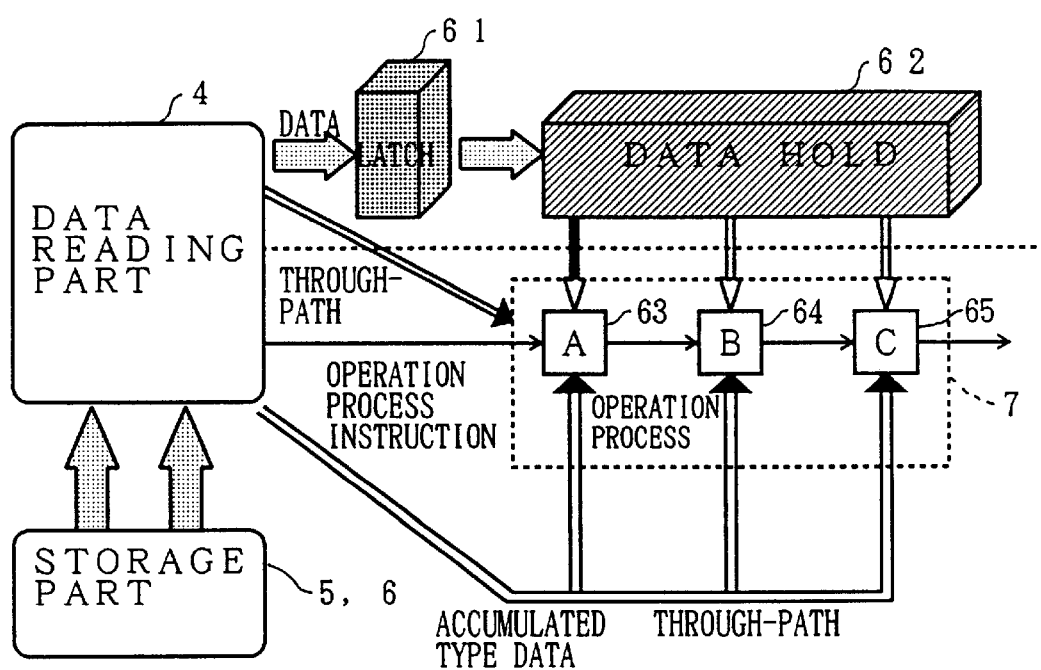
FIG. 24 is a diagram showing the hardware construction of the microprocessor capable of reducing the operation process time by not reacquiring the input data.

FIG. 24 shows the hardware construction of a further embodiment of the microprocessor according to the present invention, capable of reducing the time required to carry out the operation process by not reacquiring the input and output data.

In FIG. 24, a microprocessor includes, in addition to the elements shown in FIG. 22, a latch 61 and a storage part 62. The latch 61 latches the input data read by the data reading part 4, and the storage part 62 stores the input data latched by the latch 61. Hence, a path is provided to notify the input data to operation unit resources 63, 64 and 65 within the operation process executing part 7 via the latch 61 and the storage part 62.

When reusing the input data which is once used within the operation process executing part 7, this embodiment of the microprocessor can read the input data held in the above described path, without reading the input data from the storage part 5.

Accordingly, in this embodiment of the microprocessor, it is possible to reuse the input data of the operation unit resource during its operation by another operation unit resource, without the need to reread the input data from the storage part 5, thereby reducing the time required to carry out the operation process. Furthermore, even in a case where the re-acquired input data changes due to another operation process, it is possible to use the input data before the change occurs.

In addition, in the microprocessor shown in FIG. 24, a through-path is provided to notify the input data read by the data reading part 4 directly to each of the operation unit resources 63, 64 and 65 within the operation process executing part 7.

Moreover, each of the operation unit resources 63, 64 and 65 within the operation process executing part 7 has an input port with a multi-port structure for the input data. Hence, the operation unit resources 63, 64 and 65 can simultaneously input the necessary input data, and it is unnecessary to repeatedly obtain the input data from the storage part 5. Consequently, the time required to carry out the operation process is also reduced from this point of view.

Figure 25A:
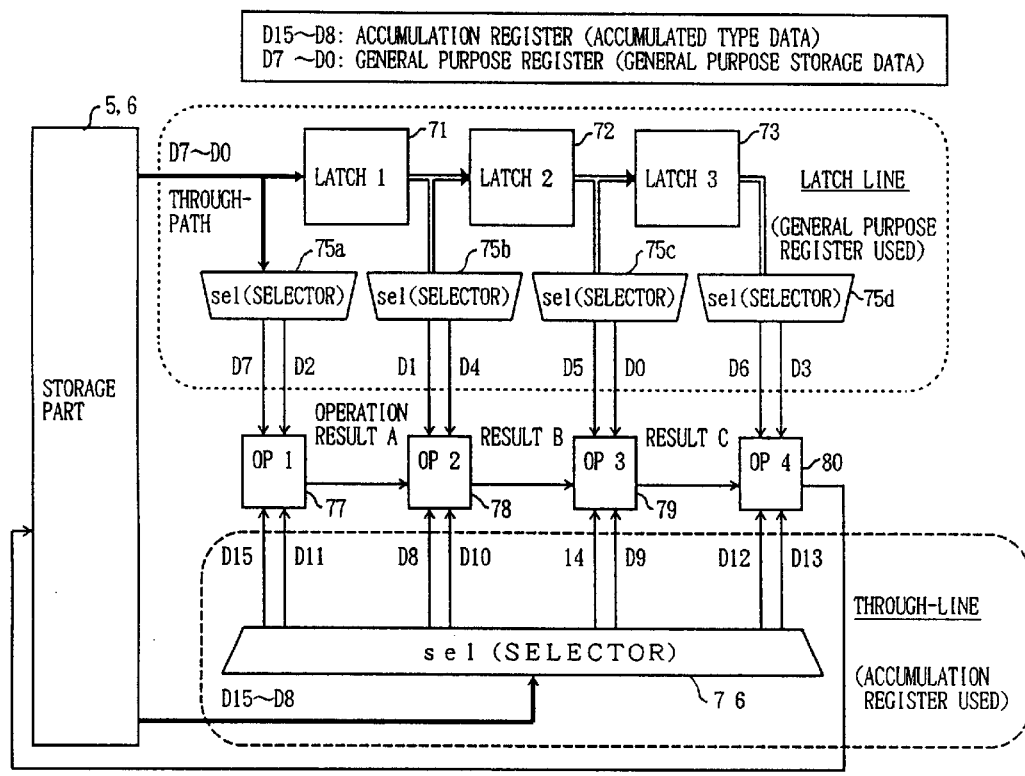
FIGS. 25A and 25B are diagrams showing the constructions of the microprocessor employing the hardware construction shown in FIG. 24.
Figure 25B:
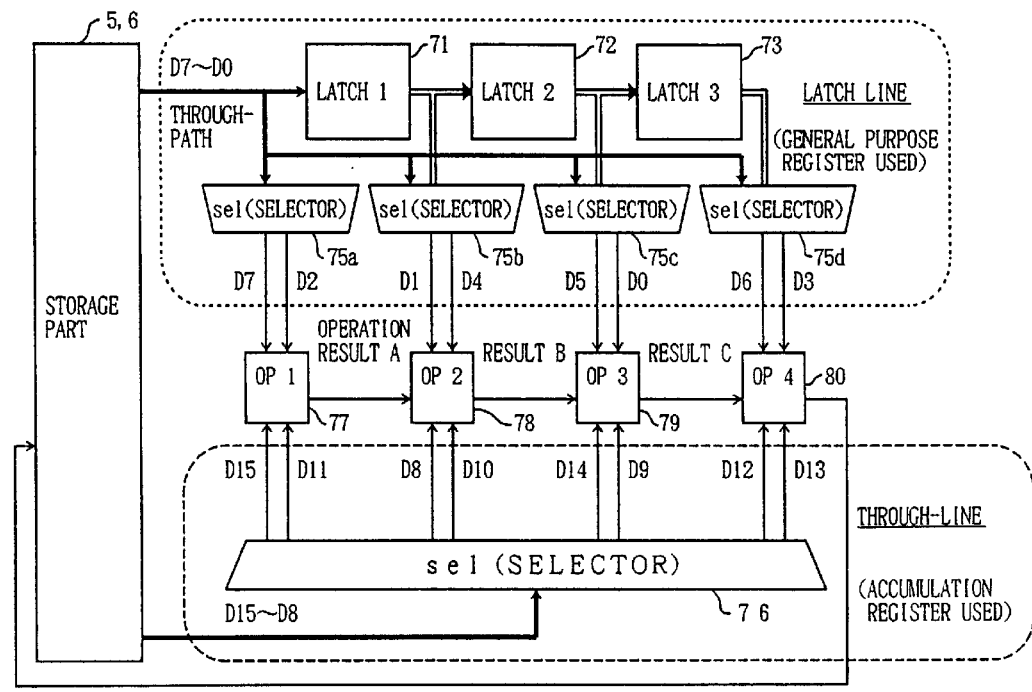

FIGS. 25A and 25B show more detailed constructions of the microprocessor shown in FIG. 24 for a case where the operation process is carried out using data (accumulation type data) D15 through D8 from accumulation registers, and data D7 through D0 from general purpose registers.

In the microprocessor shown in FIG. 25A, after reading the data D7 through D0 from the general purpose registers, the data D7 through D0 are notified to an operation unit resource 77 via a selector 75*a* in a through-path, and at the same time, are notified to each of latches 71, 72 and 73 corresponding to operation unit resources 78, 79 and 80 and held in a latch-line shown in FIG. 25A.

In this latch-line, the latches 71, 72 and 73 are provided in correspondence with the operation unit resources 78, 79 and 80, and the operation unit resources 78, 79 and 80 can read the data via corresponding selectors 75*b*, 75*c* and 75*d* when necessary.

In addition, the data D15 through D8 from a storage part which accumulates the operation results, such as the accumulation register, are notified to a through-line so as to improve the throughput, and are usable by each of the operation unit resources 77 through 80 via a selector 76.

Furthermore, by making the input port of the data reading part 4 a multi-port structure, all of the operation unit resources 77 through 80 can simultaneously read the necessary data, and a pipeline stall caused by the conflict with respect to the data reading part 4 will not occur. As a result, it is possible to reduce the time required to carry out the operation process.

The microprocessor shown in FIG. 25A latches the input data from the storage parts 5 and 6, such as the register, cache and memory. Thus, it is unnecessary to input the input data again, and the input data can be reused during operation of the operation unit resource. Therefore, even if the input data is rewritten by another operation process, the microprocessor can use the input data before the rewriting.

On the other hand, in the microprocessor shown in FIG. 25B, after reading the data D7 through D0 from the general purpose registers, the data D7 through D0 are notified to the operation unit resources 77 78, 79 and 80 via corresponding selectors 75*a*, 75*b*, 75*c* and 75*d* in a through-path, and at the same time, are notified to each of the latches 71, 72 and 73 corresponding to the operation unit resources 78, 79 and 80 and held in a latchline shown in FIG. 25B.

In this latch-line, the latches 71, 72 and 73 are provided in correspondence with the operation unit resources 78, 79 and 80, and the operation unit resources 78, 79 and 80 can read the data via the corresponding selectors 75*b*, 75*c* and 75*d* when necessary.

In addition, the data D15 through D8 from a storage part which accumulates the operation results, such as the accumulation register, are notified to a through-line so as to improve the throughput, and are usable by each of the operation unit resources 77 through 80 via the selector 76.

Furthermore, by making the input port of the data reading part 4 a multi-port structure, all of the operation unit resources 77 through 80 can simultaneously read the necessary data, and a pipeline stall caused by the conflict with respect to the data reading part 4 will not occur. As a result, it is possible to reduce the time required to carry out the operation process.

The microprocessor shown in FIG. 25B uses the input data from either the path which notifies the operation unit resource after latching or the through-path which notifies the operation unit resource directly. Thus, the microprocessor can minimize an operation process delay necessary to latch the input and output data from the storage parts 5 and 6.

Figure 26:
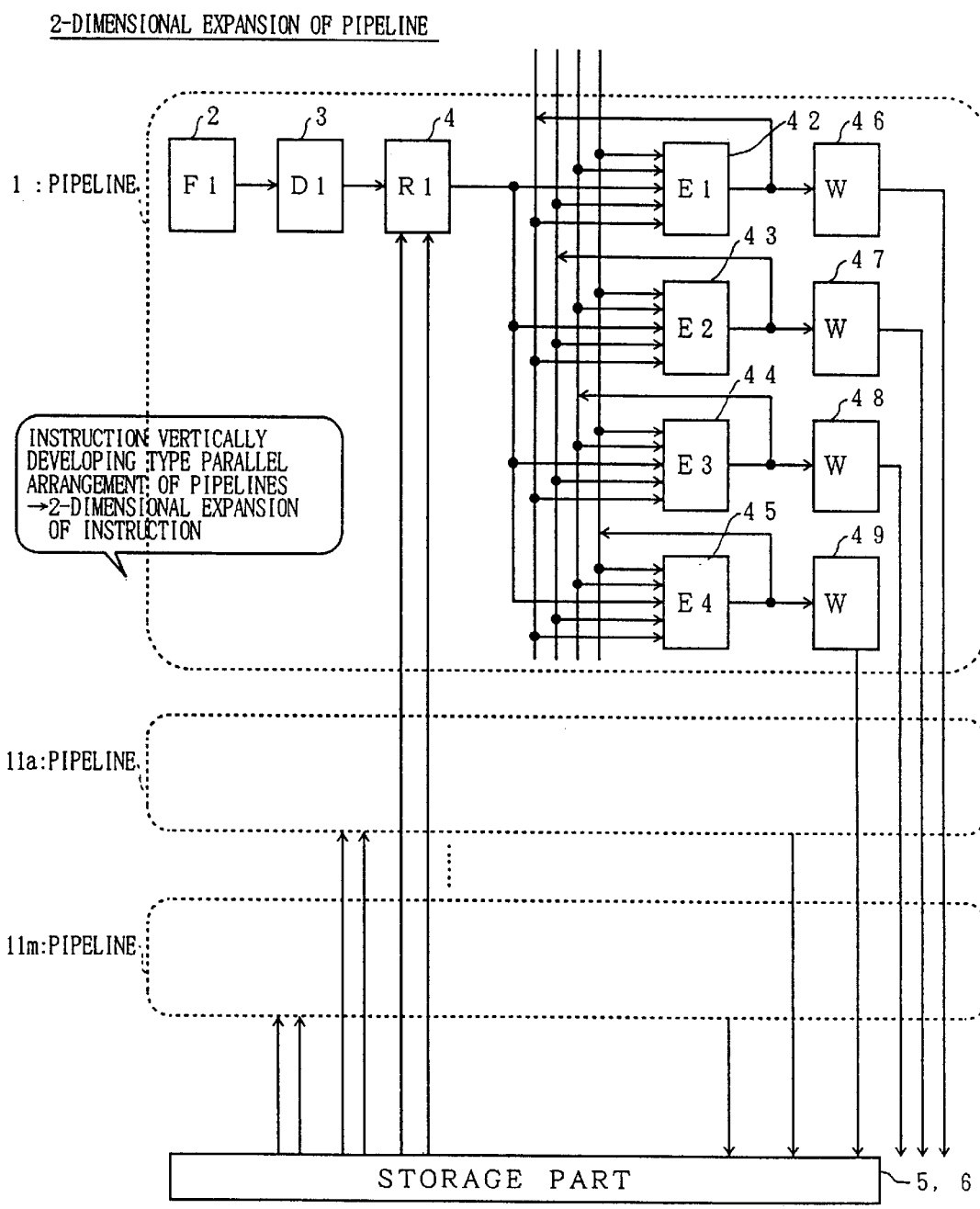
FIG. 26 is a diagram showing the microprocessor having a plurality of pipelines coupled in parallel respectively having the pipeline structure of the microprocessor shown in FIG. 18.

FIG. 26 shows an embodiment of the microprocessor according to the present invention, in which a plurality of pipelines having the pipeline structure of the microprocessor shown in FIG. 15 are coupled in parallel.

This embodiment of the microprocessor includes the pipeline 11 shown in FIG. 18, and pipelines 11*a*, . . . , 11*m* having the same functions as the pipeline 11. Each of the pipelines 11, 11*a*, . . . , 11*m* are coupled in parallel, so that the operation process can be executed more efficiently. Here, m is an arbitrary integer.

Next, a description will be given of an embodiment of a computer-readable recording medium according to the present invention. The computer-readable recording medium stores circuit information related to the construction of any of the microprocessors of the present invention described above. The circuit information is read from the computer-readable recording medium by a computer system shown in FIG. 27, for example, and is used to design the microprocessor.

This embodiment of the computer-readable recording medium stores circuit information which is written in a hardware description language and is related to a microprocessor capable of executing a process instruction having at least one RISC type instruction, and is characterized by a first data region storing circuit information related to instruction decoding means for decoding a microcode including information which indicates transfer contents of input and output data, and address information which indicates a storage location of the process instruction, a second data region storing circuit information related to data reading means for reading an input data corresponding to the information which indicates the transfer contents of the input and output data decoded by the instruction decoding means, and a process instruction corresponding to the address information, and a third data region storing circuit information related to operation process executing means for implementing one or a plurality of operation unit resources capable of executing an operation process according to the input data read by the data reading means and the process instruction.

Figure 27:
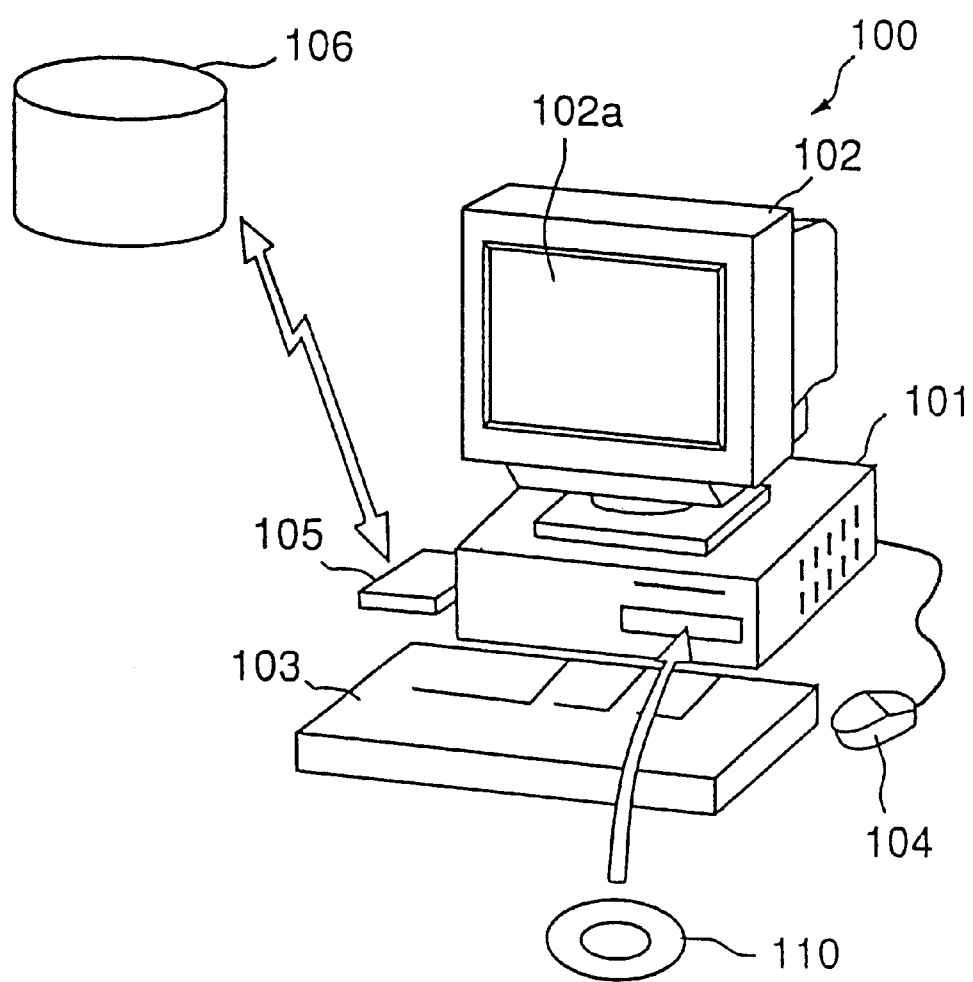
FIG. 27 is a diagram showing a computer system which reads circuit information from a computer-readable recording medium of the present invention.

A computer system 100 shown in FIG. 27 includes a main body part 101 which includes a CPU, a disk drive unit and the like, a display 102 which displays an image on a display screen 102a in response to an instruction from the main body part 101, a keyboard 103 for inputting various information to the computer system 100, a mouse 104 for specifying an arbitrary position on the display screen 102a of the display 102, and a modem 105 for accessing an external database or the like and downloading a program or the like stored in another computer system. Circuit information written in a hardware description language is stored in a portable recording medium such as a disk 110 or, is downloaded from a recording medium 106 of another computer system using a communication unit such as the modem 105. This circuit information is input to and compiled by the computer system 100. The computer system 100 is installed with a compiler forming a program of a field programmable gate array (FPGA) or forming exposure data and exposure pattern of an actual circuit by reading cell library information, based on the circuit information which is written in the hardware description language. The cell library information is prepare for each kind of FPGA, for each manufacturing apparatus, or for each kind of semiconductor in which the microprocessor is formed, such as a 2.5 $\mu$m pitch wiring rule for the CMOS. The exposure pattern formed by the compiler is used to expose a photoresist on a semiconductor wafer such as a silicon wafer by an exposure apparatus such as a stepper. The exposed photoresist is developed and functions as a mask, so as to carry out impurity doping to form p-type or n-type semiconductors and to form wirings which connect semiconductor circuits. The microprocessor is formed in this manner based on the circuit information stored in the recording medium. The recording medium which stores the circuit information is not limited to a portable or removable recording medium such as an IC card memory, floppy disk, magneto-optical disk and CD-ROM, and also includes a recording medium accessible by a computer system which is coupled via a communication means or a communication unit such as LAN and modem.

According to the microprocessor of the present invention, it is possible to read the process instruction based on the address information (operation ID) which indicates the storage location of the process instruction forming the microcode. Hence, it is possible to cope with a complex and high-level operation process instruction while reducing the size of the microcode.

In addition, by using a high-level process instruction (forming one process instruction by a plurality of RISC type instructions) and using the address information (operation ID) which indicates the storage location of the process instruction forming the microcode, the microprocessor of the present invention can reduce the number of process instructions, and at the same time reduce the CPI.

Moreover, since the microprocessor of the present invention uses the operation result of one operation unit resource directly as the input of the next operation unit resource, without temporarily storing the operation result in a register or the like, unlike the conventional microprocessor, no pipeline stall is generated while the data is exchanged, and it is unnecessary to insert a dummy cycle with respect to the pipeline stall. For this reason, it is possible to execute the operation process in a minimum number of cycles depending on the content of the operation process.

Further, according to the microprocessor of the present invention, a plurality of RISC type instruction are included within one process instruction, and the operation result is written in a storage part in the sequence in which the operation process ends. Unlike the conventional microprocessor in which the subsequent instruction must wait until the operation process of a previous instruction ends, no pipeline stall is generated in the present invention, and the operation process can be executed in a minimum number of cycles.

On the other hand, even in a case where a conflict occurs among the writing from the pipelines to a storage part, the microprocessor of the present invention can avoid the conflict by distributing the instruction among operation unit resources having the same functions within the same pipeline, and employing a multi-port structure for the output of the operation result.

In addition, when executing a predetermined operation process by acquiring input data from a storage part, the microprocessor according to the present invention holds the input data, so that it is unnecessary to reacquire the same input data when it becomes necessary. As a result, the operation process can be executed efficiently.

Moreover, the microprocessor according to the present invention includes a plurality of operation unit resources within the same pipeline, which may be coupled arbitrarily by the user. Hence, compared to the conventional microprocessor which arranges a plurality of pipelines in parallel, it is possible to reduce the scale of the hardware and also reduce the power consumption.

Therefore, according to the present invention, it is possible to realize a microprocessor, operation process execution method and recording medium, which can cope with the complexity and high level of the operation process instruction by minimizing the size of the microcode, and wherein the operation process can be executed efficiently depending on the operation process instruction. Furthermore, the present invention can reduce both the hardware scale and the power consumption of the microprocessor.

Further, the present invention is not limited to these embodiments, but various variations and modifications may be made without departing from the scope of the present invention.

What is claimed is:

1. A microprocessor capable of executing a process instruction having at least one Reduced Instruction Set Computer (RISC) type instruction, comprising:

instruction decoding means for decoding a microcode including information which indicates transfer contents of input and output data and address information which indicates a storage location of the process instruction;

data reading means for reading input data corresponding to the information which indicates the transfer contents of the input and output data decoded by said instruction decoding means, and reading the process instruction corresponding to the address information; and operation process executing means for implementing one or a plurality of operation unit resources capable of executing an operation process according to the input data read by said data reading means and the process instruction.

2. The microprocessor as claimed in claim 1, wherein:

the microcode is capable of implementing at least one RISC type instruction, directly, in place of the address information which indicates the storage location of the process instruction.

3. The microprocessor as claimed in claim 1, further comprising:

process instruction storage means capable of arbitrarily constructing a process instruction; and input and output data storage means for storing an operation result of said operation process executing means and arbitrary input data, said data reading means reads a corresponding process instruction by referring to said process instruction storage means based on the address information which indicates the storage location of the process instruction, and further reading from said input and output data storage means the input data corresponding to the information which indicates the transfer contents of the input and output data.

4. The microprocessor as claimed in claim 3, further comprising:

a first path notifying directly to said data reading means an operation result of a final operation unit resource corresponding to a process instruction executed by said operation process executing means, simultaneously as storing said operation result in said input and output data storage means; and a second path notifying to said data reading means said operation result after latching said operation result, said data reading means reading the operation result from one of said first and second paths instead of from said input and output data storage means, when using said operation result in a next process instruction.

5. The microprocessor as claimed in claim 3, wherein:

said data reading means comprises an input port with a multi-port structure for inputting the input data from said input and output data storage means, and simultaneously supplies the input data to each operation unit resource.

6. The microprocessor as claimed in claim 1, further comprising a process instruction storage means capable of arbitrarily constructing a process instruction, and wherein said operation process executing means includes a plurality of operation unit resources which are arbitrarily connectable, by modifying the process instruction within said process instruction storage means, an operation result of one of the operation unit resources being directly used as an input to a next operation unit resource.

7. The microprocessor as claimed in claim 6, wherein:

said operation process executing means includes a through-path which propagates the input data with respect to a process which requires no further operation unit resource, an output result of the through-path being directly used as an input to a next operation unit resource.

8. The microprocessor as claimed in claim 6, wherein:

said operation process executing means outputs only an operation result of a final operation unit resource corresponding to the process instruction when an operation result of one operation unit resource is directly used as an input to a next operation unit resource.

9. The microprocessor as claimed in claim 1, wherein:

said operation process executing means executes in parallel RISC type instructions implemented in the process instruction, and outputs operation results in a sequence in which operation processes end, independently of an executing sequence of the operation processes.

10. The microprocessor as claimed in claim 1, wherein:

each operation unit resource within said operation process executing means has a multi-port construction for independently outputting operation results.

11. The microprocessor as claimed in claim 1, wherein:

if a plurality of operation unit resources having identical functions exist, a plurality of RISC type instructions are included within one process instruction, and a conflict of the operation unit resources occurs when the RISC type instructions are executed in parallel, said operation process executing means carries out a conflict resolution processing using another operation unit resource having a function which is identical to the identical functions.

12. The microprocessor as claimed in claim 1, further comprising:

a third path notifying an operation unit resource within said operation process executing means after latching the input data read by said data reading means, said operation process executing means reading the input data from said third path when reading said input data.

13. The microprocessor as claimed in claim 12, further comprising:

a fourth path notifying directly to an operation unit resource within said operation process executing means the input data read by said data reading means, said operation process executing means using the input data from one of said third and fourth paths.

14. The microprocessor as claimed in claim 12, wherein:

the input data which is latched by said third path is usable in each operation unit resource within said operation process executing means.

15. The microprocessor as claimed in claim 1, further comprising:

a plurality of pipelines capable of executing an operation process corresponding to the microcode.

16. A microprocessor capable of executing a process instruction having at least one Reduced Instruction Set Computer (RISC) type instruction, comprising:

a plurality of operation unit resources capable of executing an operation process according to an input data and a process instruction, and arbitrarily connectable by modifying the process instruction, an operation result of one operation unit resource being used as an input to a next operation unit resource, without being temporarily stored; and a through-path which propagates the input data with respect to a process which requires no further operation unit resource, an output result of the through-path being directly used as an input to a next operation unit resource.

17. A microprocessor capable of executing a process instruction having at least one Reduced Instruction Set Computer (RISC) type instruction, comprising:

a plurality of operation unit resources capable of executing an operation process according to an input data and a process instruction, and arbitrarily connectable by modifying the process instruction, an operation result of one operation unit resource being used as an input to a next operation unit resource, without being temporarily stored.

wherein only an operation result of a final operation unit resource corresponding to the process instruction is output when the operation result of an operation unit resource is directly used as the input to the next operation unit resource without being temporarily stored.

18. An operation process execution method for a microprocessor capable of executing a process instruction having at least one Reduced Instruction Set Computer (RISC) type instruction, comprising:

decoding a microcode including information which indicates transfer contents of input and output data and address information which indicates a storage location of the process instruction;

reading input data corresponding to the information which indicates the transfer contents of the input and output data decoded by said decoding, and reading the process instruction corresponding to the address information; and implementing one or a plurality of operation unit resources capable of executing an operation process according to the input data read by a data reading means and the process instruction.

19. A microprocessor comprising:

instruction decoding means for decoding a microcode; and;

operation process executing means including a plurality of operation unit resources capable of executing an operation process in parallel and more than said instruction decoding means, an operation result of one of the operation unit resources being directly used as an input to a next operation unit resource, an operation sequence of the operation unit resources being variable in said operation process executing means.

20. The microprocessor as claimed in claim 19, wherein said plurality of operation unit resources are made up of different operation units.

21. A microprocessor comprising:

instruction decoding means for decoding a microcode made up of a basic instruction code and an operation identification (ID) indicating a storage location of an extended instruction code; and operation process executing means for executing an operation process by selecting operation unit resources based on an operation instruction decoded by said instruction decoding means, a pipeline process being carried out by selecting a first operation unit resource by the basic instruction code and selecting a next operation unit resource by the extended instruction code.

22. A microprocessor capable of decoding a microcode which uses a plurality of operation unit resources, comprising:

a function of automatically allocating inputs and outputs among the operation unit resources depending on a free internal resource, said function requiring no inputs and outputs among the operation unit resources to be specified within the microcode.

23. The microprocessor as claimed in claim 22, wherein:

an output one operation unit resource is directly connected to an input of another operation unit resource which is used for a next operation, thereby eliminating a need to use an input and output means for inputting and outputting operation results among the operation unit resources.

24. A microprocessor architecture for a microprocessor capable of executing a process instruction having at least one Reduced Instruction Set Computer (RISC) type instruction, comprising:

instruction decoding means for decoding a microcode including information which indicates transfer contents of input and output data, and address information which indicates a storage location of the process instruction;

data reading means for reading an input data corresponding to the information which indicates the transfer contents of the input and output data decoded by said instruction decoding means, and a process instruction corresponding to the address information; and operation process executing means for implementing one or a plurality of operation unit resources capable of executing an operation process according to the input data read by said data reading means and the process instruction.

25. A computer-readable recording medium storing circuit information which is written in a hardware description language and is related to a microprocessor capable of executing a process instruction having at least one Reduced Instruction Set Computer (RISC) type instruction, comprising:

a first data region storing circuit information related to instruction decoding means for decoding a microcode including information which indicates transfer contents of input and output data, and address information which indicates a storage location of the process instruction;

a second data region storing circuit information related to data reading means for reading an input data corresponding to the information which indicates the transfer contents of the input and output data decoded by said instruction decoding means, and a process instruction corresponding to the address information; and a third data region storing circuit information related to operation process executing means for implementing one or a plurality of operation unit resources capable of executing an operation process according to the input data read by said data reading means and the process instruction.

26. A microprocessor capable of executing a process instruction having at least one Reduced Instruction Set Computer (RISC) type instruction, comprising:

an instruction decoding part which decodes a microcode including information which indicates transfer contents of input and output data and address information which indicates a storage location of the process instruction;

a data reading part which reads input data corresponding to the information which indicates the transfer contents of the input and output data decoded by said instruction decoding part, and reads the process instruction corresponding to the address information; and an operation process executing part which implements one or a plurality of operation unit resources capable of executing an operation process according to the input data read by said data reading part and the process instruction.

27. A microprocessor comprising:

an instruction decoding part which decodes a microcode; and an operation process executing part which includes a plurality of operation unit resources capable of executing an operation process in parallel and more than said instruction decoding part,
 an operation sequence of the operation unit resources being variable in said operation process executing part.

28. A microprocessor architecture for a microprocessor capable of executing a process instruction having at least one Reduced Instruction Set Computer (RISC) type instruction, comprising:

an instruction decoding part which decodes a microcode including information which indicates transfer contents of input and output data, and address information which indicates a storage location of the process instruction;

a data reading part which reads an input data corresponding to the information which indicates the transfer contents of the input and output data decoded by said instruction decoding part, and a process instruction corresponding to the address information; and an operation process executing part which implements one or a plurality of operation unit resources capable of executing an operation process according to the input data read by said data reading part and the process instruction.

29. A computer-readable recording medium storing circuit information which is written in a hardware description language and is related to a microprocessor capable of executing a process instruction having at least one Reduced Instruction Set Computer (RISC) type instruction, comprising:

a first data region storing circuit information related to an instruction decoding part which decodes a microcode including information which indicates transfer contents of input and output data, and address information which indicates a storage location of the process instruction;

a second data region storing circuit information related to a data reading part which reads an input data corresponding to the information which indicates the transfer contents of the input and output data decoded by said instruction decoding part, and a process instruction corresponding to the address information; and a third data region storing circuit information related to an operation process executing part which implements one or a plurality of operation unit resources capable of executing an operation process according to the input data read by said data reading part and the process instruction.

30. A microprocessor comprising:

an instruction decoding part which decodes a microcode; and an operation process executing part which includes a plurality of operation unit resources capable of executing an operation process in parallel and more than said instruction decoding part,
 an operation result of one of the operation unit resources being directly used as an input to a next operation unit resource,
 an operation sequence of the operation unit resources being variable in said operation process executing part.

* * * * *